United States Patent
Karras et al.

(10) Patent No.: US 9,547,932 B2
(45) Date of Patent: Jan. 17, 2017

(54) SPLITTING BOUNDING VOLUMES OF PRIMITIVES

(71) Applicant: NVIDIA Corporation, Santa Clara, CA (US)

(72) Inventors: Tero Tapani Karras, Helsinki (FI); Timo Oskari Aila, Tuusula (FI)

(73) Assignee: NVIDIA Corporation, Santa Clara, CA (US)

( * ) Notice: Subject to any disclaimer, the term of this patent is extended or adjusted under 35 U.S.C. 154(b) by 247 days.

(21) Appl. No.: 14/035,899

(22) Filed: Sep. 24, 2013

(65) Prior Publication Data

US 2014/0362074 A1 Dec. 11, 2014

Related U.S. Application Data

(60) Provisional application No. 61/833,411, filed on Jun. 10, 2013.

(51) Int. Cl.
*G06T 15/08* (2011.01)
*G06T 15/06* (2011.01)

(52) U.S. Cl.
CPC ..................................... *G06T 15/06* (2013.01)

(58) Field of Classification Search
CPC .... G06T 15/06; G06T 17/005; G06T 2210/12; G06F 17/30961
USPC ................... 345/419, 958; 382/103
See application file for complete search history.

(56) References Cited

U.S. PATENT DOCUMENTS

| | | |
|---|---|---|
| 8,253,730 B1 | 8/2012 | Carr |
| 9,013,484 B1 | 4/2015 | Jakob et al. |
| 2002/0004710 A1 | 1/2002 | Murao |
| 2009/0167763 A1* | 7/2009 | Waechter ............... G06T 15/06 345/426 |
| 2013/0016109 A1* | 1/2013 | Garanzha ............ G06F 12/0897 345/501 |
| 2013/0328876 A1 | 12/2013 | Keely |
| 2014/0340412 A1 | 11/2014 | Doyle et al. |
| 2014/0365529 A1 | 12/2014 | Aila et al. |
| 2014/0365532 A1 | 12/2014 | Karras et al. |

OTHER PUBLICATIONS

Author:Martin Stich, et al. Title: Spatial Splits in Bounding Volume Hierarchies, HPG 2009, New Orleans, Louisiana, Aug. 1-3, 2009.*
Stich, M. et al., "Spatial Splits in Bounding Volume Hierarchies," In the Proceedings of High Performance Graphics, 2009, pp. 1-7.
Aila et al., U.S. Appl. No. 14/065,321, filed Oct. 28, 2013.
(Continued)

*Primary Examiner* — Zhengxi Liu
*Assistant Examiner* — Yanna Wu
(74) *Attorney, Agent, or Firm* — Zilka-Kotab, PC

(57) ABSTRACT

A system, method, and computer program product are provided for splitting primitives. A plurality of primitives is received for a scene and a pre-determined plane that intersects the scene is identified. Bounding volumes of the plurality of primitives that are intersected by the pre-determined plane are split, where a bounding volume that encloses each intersected primitive of the plurality of primitives is split into a first bounding volume and a second bounding volume at an intersection of the bounding volume and the pre-determined plane.

18 Claims, 18 Drawing Sheets

(56) References Cited

OTHER PUBLICATIONS

Aila, T. et al., "Understanding the Efficiency of Ray Traversal on GPUs," Proc. High-Performance Graphics, Aug. 2009, pp. 1-5.
Aila, T. et al., "Understanding the Efficiency of Ray Traversal on GPUs—Kepler and Fermi Addendum," NVIDIA Technical Report NVR-2012-02, pp. 1-4.
Dammertz, H. et al., "The Edge Volume Heuristic-Robust Triangle Subdivision for Improved BVH Performance," To appear in an IEEE VGTC sponsored conference proceedings, Aug. 2008, pp. 1-4.
Garanzha, K. et al., "Simpler and Faster HLBVH with Work Queues," in High Performance Graphics 2011, Aug. 2011, pp. 1-6.
Garanzha, K. et al., "Grid-based SAH BVH construction on a GPU," The Visual Computer, Jun. 2011, vol. 27, Issue 6-8, pp. 697-706.
Goldsmith, J. et al., "Automatic Creation of Object Hierarchies for Ray Tracing," IEEE Computer Graphics and Applications, May 1987, vol. 7 Issue 5, pp. 14-20.
Karras, T., "Maximizing Parallelism in the Construction of BVHs, Octrees, and k-d Trees," Eurographics conference on High-Performance Graphics, 2012, pp. 33-37.
Kensler, A., "Tree Rotations for Improving Bounding Volume Hierarchies," To appear in the Proceedings of the IEEE 2008 Symposium on Interactive Ray Tracing, Aug. 2008, pp. 1-4.
Kopta, D. et al., "Fast, Effective BVH Updates for Animated Scenes," Proceedings of the ACM SIGGRAPH Symposium on Interactive 3D Graphics and Games, 2012.
Lauterbach, C. et al., "Fast BVH Construction on GPUs," Eurographics 2009, 2009, vol. 28, No. 2, pp. 1-10.
MacDonald, J. D. et al., "Heuristics for ray tracing using space subdivision," The Visual Computer, 1990, vol. 6, Issue 3, pp. 153-166.
Pantaleoni, J. et al., "HLBVH: Hierarchical LBVH Construction for Real-Time Ray Tracing of Dynamic Geometry," High Performance Graphics, 2010, pp. 1-9.
Popov, S. et al., "Object Partitioning Considered Harmful: Space Subdivision for BVHs," Proceedings of the Conference on High Performance Graphics, 2009, pp. 1-8.
Wald, I., "On Fast Construction of SAH-based Bounding Volume Hierarchies," IEEE Symposium on Interactive Ray Tracing, 2007, pp. 1-8.
Wald, I., "Fast Construction of SAH BVHs on the Intel Many Integrated Core (MIC) Architecture," Intel Corp Technical Report No. 2010-06-11-VAR001, pp. 1-10.
Walter, B. et al., "Fast Agglomerative Clustering for Rendering," In IEEE Symposium on Interactive Ray Tracing (RT), 2008, pp. 1-6.
Woop, S. et al., "A Ray Tracing Hardware Architecture for Dynamic Scenes," Thesis, Mar. 29, 2004, pp. 1-87.
Gu, Y. et al., "Efficient BVH Construction via Approximate Agglomerative Clustering," Proceedings of the 5th High-Performance Graphics Conference, Jul. 2013, pp. 1-8.
Ernst, M. et al., "Early Split Clipping for Bounding Volume Hierarchies," Proceedings of the IEEE Symposium on Interactive Ray Tracing, 2007, pp. 1-6.
Bittner, J. et al., "Fast Insertion-Based Optimization of Bounding Volume Hierarchies," Computer Graphics Forum, 2013, vol. 32, No. 1, pp. 85-100.
Karras et al., U.S. Appl. No. 13/970,547, filed Aug. 19, 2013.
Non-Final Office Action from U.S Appl. No. 13/970,547, dated May 20, 2016.
Non-Final Office Action from U.S Appl. No. 14/065,321, dated Mar. 17, 2016.
Final Office Action from U.S. Appl. No. 13/970,547, dated Nov. 30, 2016.
Non-Final Office Action from U.S. Appl. No. 14/065,321, dated Sep. 16, 2016.

\* cited by examiner

```
1:  function ConstructOptimalTree(S)
2:  // Single leaf?
3:  if |S| = 1 then
4:      l ← S_0
5:      return (l, C(l))
6:  end if
7:  // Try each way of partitioning the leaves
8:  (T_opt, c_opt) ← (0, ∞)
9:  for each P ⊆ S do
10:     if P != 0 and P != S then
11:         // Optimize each resulting subtree recursively
12:         (T_l, c_l) ← ConstructOptimalTree(P)
13:         (T_r, c_r) ← ConstructOptimalTree(S \ P)
14:         // Calculate SAH cost (first case of Equation 2)
15:         a ← Area(UnionOfAABBs(S))
16:         c ← C_i · a + c_l + c_r
17:         // Best so far?
18:         if c < c_opt then
19:             T_opt ← CreateInternalNode(T_l, T_r)
20:             c_opt ← c
21:         end if
22:     end if
23: end for
24: // Collapse subtree? (second case of Equation 2)
25: a ← Area(UnionOfAABBs(S))
26: t ← TotalNumTriangles(S)
27: c_opt ← min (c_opt, (C_t · a · t))
28: return (T_opt, c_opt)
29: end function
```

1: // Calculate surface area for each subset
2: for $\bar{s}$ = 1 to $2^n - 1$ do
3:   $a[\bar{s}] \leftarrow$ Area(UnionOfAABBs($L, s$))
4: end for
5: // Initialize costs of individual leaf nodes
6: for $i = 0$ to $n - 1$ do
7:   $c_{opt}[2^i] \leftarrow C(L_i)$
8: end for
9: // Optimize every subset of leaf nodes
10: for $k = 2$ to $n$ do
11:   for each $\bar{s} \in [1, 2^{(n-1)}]$ with $k$ set bits do
12:     // Try each way of partitioning the leaf nodes
13:     $(c_{\bar{s}}, \bar{p}_{\bar{s}}) \leftarrow (\infty, 0)$
14:     for each $\bar{p} \in$ {partitionings of $\bar{s}$} do
15:       $c \leftarrow c_{opt}[\bar{p}] + c_{opt}[\bar{s}\text{ XOR }\bar{p}]$  // $S \setminus P$
16:       if $c < c_{\bar{s}}$ then $(c_{\bar{s}}, \bar{p}_{\bar{s}}) \leftarrow (c, \bar{p})$
17:     end for
18:     // Calculate final SAH cost (Equation 2)
19:     $t \leftarrow$ TotalNumTriangles($L, \bar{s}$)
20:     $c_{opt}[\bar{s}] \leftarrow \min((C_i \cdot a[\bar{s}] + c_{\bar{s}}), (C_t \cdot a[\bar{s}] \cdot t))$
21:     $\bar{p}_{opt}[\bar{s}] \leftarrow \bar{p}_{\bar{s}}$
22:   end for
23: end for

*Fig. 4B*

1: $\bar{\delta} \leftarrow (\bar{s} - 1)$ AND $\bar{s}$
2: $\bar{p} \leftarrow (-\bar{\delta})$ AND $\bar{s}$
3: repeat
4: $\quad c \leftarrow c_{opt}[\bar{p}] + c_{opt}[\bar{s}\ \text{XOR}\ \bar{p}]$
5: $\quad$ if $c < c_{\bar{s}}$ then $(c_{\bar{s}}, \bar{p}_{\bar{s}}) \leftarrow (c, \bar{p})$
6: $\quad \bar{p} \leftarrow (\bar{p} - \bar{\delta})$ AND $\bar{s}$
7: until $\bar{p} = 0$

US 9,547,932 B2

SPLITTING BOUNDING VOLUMES OF PRIMITIVES

CLAIM OF PRIORITY

This application claims the benefit of U.S. Provisional Application No. 61/833,411, filed Jun. 10, 2013, the entire contents of which is incorporated herein by reference.

FIELD OF THE INVENTION

The present invention relates to graphics processing, and more particularly to splitting bounding volumes of primitives.

BACKGROUND

To promote high efficiency processing of graphics primitives, large primitives may be subdivided into a plurality of smaller primitives prior to construction of a high-quality bounding volume hierarchy (BVH). High-quality BVHs are essential for performing efficient ray tracing on a graphics processing unit (GPU). One conventional technique splits bounding boxes of triangle primitives along a longest axis of the bounding box if the surface area of the bounding box exceeds a pre-defined threshold as described by Ernst and Greiner [2007]. A similar scheme to split triangle primitive edges based on the volume of the axis-aligned bounding boxes of the triangle primitives is proposed by Dammertz and Keller [2008]. However, neither of these techniques has been proven to reliably improve ray tracing performance in practice. Instead, for some scenes, the ray tracing performance decreases. Another problem is that the amount of memory needed to store the data generated when the bounding boxes are split is difficult to predict. Thus, there is a need for addressing the issue of splitting bounding boxes of primitives to improve ray tracing performance and/or other issues associated with the prior art.

SUMMARY

A system, method, and computer program product are provided for splitting bounding volumes of primitives. A plurality of primitives is received for a scene and a pre-determined plane that intersects the scene is identified. Bounding volumes of the plurality of primitives that are intersected by the pre-determined plane are split, where a bounding volume that encloses each intersected primitive of the plurality of primitives is split into a first bounding volume and a second bounding volume at an intersection of the bounding volume and the pre-determined plane.

BRIEF DESCRIPTION OF THE DRAWINGS

FIG. 4A illustrates example code of a function for performing a step of FIG. 3, in accordance with one embodiment;

FIG. 4B illustrates example code for performing a step of FIG. 3, in accordance with one embodiment;

DETAILED DESCRIPTION

Figure 1:
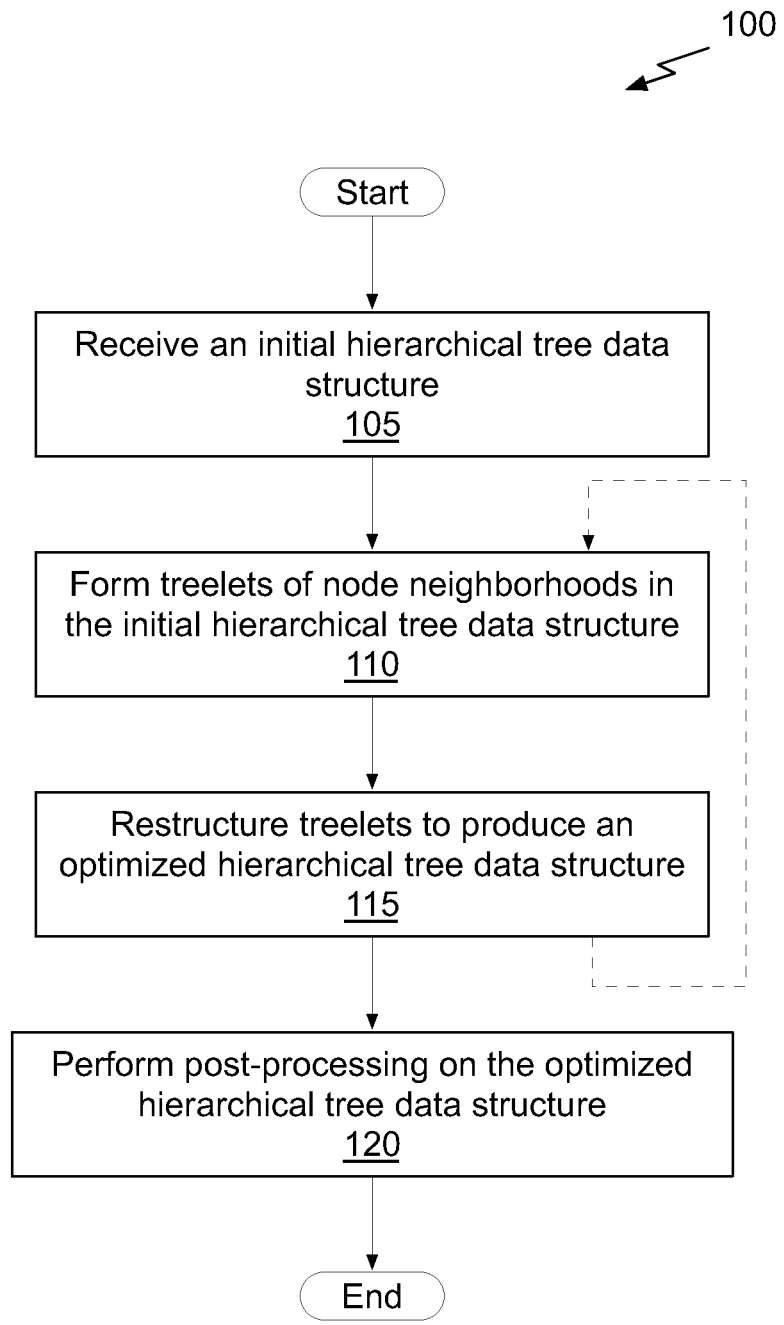
FIG. 1 illustrates a flowchart of a method for restructuring a hierarchical tree data structure, in accordance with one embodiment.

Rather than splitting primitive bounding boxes based on surface area or volume, bounding volumes of primitives are split based on pre-determined split planes. The split planes may be spatial split planes that are aligned with an axis of a three-dimensional scene space defined by (x,y,z) coordinates. For example, a split plane may be aligned relative to the plane formed by the x and z axes, the plane formed by the x and y axes, or the plane formed by the y and z axes. The bounding volume of each primitive may be split prior to construction of a BVH to improve ray tracing performance that relies on the BVH. The pre-determined split planes may correspond to partitioning planes used to construct the BVH, so that, when a hierarchical tree data structure is constructed from the resulting bounding volumes, the overlap between sibling nodes is effectively minimized. The number of splits that are performed may be bounded so that the amount of memory needed to store the data generated during the splitting is known. The splits may be performed recursively for bounding volumes of primitives that are intersected by one or more pre-determined planes. The splitting technique using pre-determined split planes is described in detail in conjunction with FIGS. 5A, 6A-F, 7A, and 7B.

High-Quality BVH Construction Through Treelet Restructuring

A low-quality hierarchical tree data structure may be constructed, and the node topology of the low-quality hierarchical tree data structure may be restructured, at least in part, in a parallel manner to produce a higher-quality hierarchical tree data structure. In one embodiment, the hierarchical tree data structure is a bounding volume hierarchy (BVH) that may be used to perform ray tracing. A restructured BVH is capable of performing ray casts significantly faster and may be produced at interactive rates. The interactive rates are needed to support application programs for product and architectural design and movie rendering that require high quality images at interactive rates.

In contrast, conventional techniques either generate low-quality BVHs at interactive rates or high-quality BVHs at non-interactive rates. The restructured BVH that is produced achieves ~96% of the ray tracing performance compared to a very high-quality BVH constructed using a conventional CPU-based top-down construction method. However, the conventional CPU-based top-down construction technique cannot typically be performed at interactive rates. Techniques for constructing a low-quality BVH may be much faster compared with the conventional CPU-based top-down construction technique, but the low-quality BVH is typically only capable of producing 67% of the ray tracing performance compared to the conventional CPU-based top-down construction technique. In contrast, using the techniques described further herein, the time needed to construct the restructured BVH is only 2-3× compared to the fastest BVH construction techniques and the ray tracing performance of the restructured BVH is 96% of the highest-quality BVH.

FIG. 1 illustrates a flowchart of a method 100 for generating a hierarchical tree data structure, in accordance with one embodiment. At step 105, an initial hierarchical tree data structure is received. In one embodiment, the hierarchical tree data structure may be a BVH. At step 110, treelets of node neighborhoods are formed in the hierarchical tree data structure. In the context of the following description, a treelet is a small, localized neighborhood of nodes (e.g., 5-10 nodes), where each node represents at least one element (i.e., at least one triangle or geometric primitive). The nodes in the treelet are a collection of immediate descendants of a given treelet root, consisting of n treelet leaf nodes and n−1 treelet internal nodes. A treelet leaf node can act as a representative of a subtree including two or more descendant nodes, or a treelet leaf node may be an actual leaf node that does not have any child nodes. In one embodiment, a parallel bottom-up traversal algorithm is used to form sets of non-overlapping treelets. The sets of non-overlapping treelets may be formed based on a Surface Area Heuristic (SAH) cost analysis.

At step 115, the treelets are restructured to produce an optimized hierarchical tree data structure. As a result, the topology of the hierarchical tree data structure is modified. In one embodiment, multiple treelets can be processed in parallel, and it is also possible to employ multiple threads to process a given treelet. At step 120, post-processing is performed on the optimized hierarchical tree data structure to collapse subtrees into leaf nodes to prepare the optimized hierarchical tree data structure for ray-tracing operations. In one embodiment, steps 110 and 115 may be repeated multiple times to produce the optimized hierarchical tree data structure.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Ray tracing performance is most commonly estimated using the SAH model, first introduced by Goldsmith and Salmon in 1987 and later formalized by MacDonald and Booth in 1990. The classic approach for constructing BVHs is based on greedy top down partitioning of primitives that aims to minimize the SAH cost at every step. The SAH cost of a given acceleration structure is defined as the expected cost of tracing a non-terminating random ray through the scene:

$$C_i \sum_{n \in I} \frac{A(n)}{A(\text{root})} + C_l \sum_{l \in L} \frac{A(l)}{A(\text{root})} + C_t \sum_{l \in L} \frac{A(l)}{A(\text{root})} N(l) \qquad (1)$$

where I and L in Equation 1 are the sets of internal nodes and leaf nodes, respectively, and $C_i$ and $C_l$ are their associated traversal costs. $C_t$ is the cost of a ray-primitive intersection test, and N(l) denotes the number of primitives referenced by leaf node l. The surface area of the bounding volume of node n is indicated by A(n), and the ratio A(n)/A(root) corresponds to the conditional probability that a random ray intersecting the root is also going to intersect n. In the context of the following description, $C_i$=1.2, $C_l$=0, and $C_t$=1, which have been verified experimentally to give the highest correlation with the measured performance.

During construction of a BVH using the conventional technique by MacDonald and Booth 1990, the primitives at each node are classified to either side of an axis-aligned split plane according to the centroids of their axis-aligned bounding boxes (AABBs). The split plane is chosen by evaluating the SAH cost of the resulting child nodes for each potential plane, and selecting the one that results in the lowest cost. Leaf nodes are created when the SAH cost can no longer be improved through partitioning, i.e., the benefit of creating a new internal node is outweighed by its cost. As previously explained, the technique is slow and while a high-quality BVH may be constructed, the construction time is too long for interactive applications.

Local tree rotations (i.e., node swaps) are proposed by Kensler in 2008 to improve the SAH cost of an existing BVH. Kensler's technique modifies the set of children (i.e., child nodes) of at most two nodes of the tree for each tree rotation. Recently, an alternative algorithm based on iteratively removing nodes from the tree and inserting them back at optimal locations has been described by Bittner et al. in 2013. Since there are a large number of options for modifying the tree at each step, the algorithm is able to improve the quality significantly before getting stuck. However, since the technique is fundamentally serial, it is unclear whether the technique can be made to run at interactive rates. In the technique, a single removal-reinsertion operation may modify the set of children of at most three nodes of the tree.

A new approach for constructing high-quality BVHs as quickly as possible begins with an existing low-quality BVH and modifies the low-quality BVH to substantially equal the quality of a BVH constructed using conventional CPU-based top-down construction techniques. Instead of looking at individual nodes, neighborhoods of nodes referred to as treelets are formed and restructured. While the treelet constitutes a valid binary tree on its own, the treelet does not necessarily have to extend all the way down to the leaf nodes of the BVH. In other words, the children of every internal node of the treelet must be contained in the treelet, but a treelet leaf can act as a representative of an arbitrarily large subtree.

The restructuring technique repeatedly forms treelets for each root node and restructures the nodes within each treelet to minimize the overall SAH cost. The treelet leaf nodes and associated subtrees are kept intact during the restructuring, which means that the contents of the subtrees are not relevant as far as the optimization is concerned—only properties of the treelet leaf nodes themselves (e.g., AABBs) are considered during the restructuring. Thus, the processing of each treelet is a perfectly localized operation, so that multiple treelets may be restructured in parallel.

Restructuring a given treelet can be viewed as discarding the existing internal nodes of the treelet and then constructing a new binary tree for the same set of treelet leaf nodes. A treelet internal node has two child nodes that may each be either a treelet internal node or a treelet leaf node. A treelet leaf node can represent a subtree including at least two child nodes, as described further herein, or a treelet leaf node may be an actual leaf node that does not have any child nodes. As the number of treelet leaf nodes remains unchanged, there will also be the same number of treelet internal nodes in the new treelet. The only thing that really changes, in addition the connectivity of the nodes, is the set of bounding volumes stored by the treelet internal nodes. In other words, restructuring provides a mechanism to reduce the surface area of the treelet internal nodes, which in turn translates directly to reducing the overall SAH cost of the BVH (equation 1).

Finding the optimal node topology for a given treelet is believed to be a non-deterministic polynomial-time (NP)—hard problem, and the best known algorithms are exponential with respect to n. However, in practice, a high-quality BVH may be generated from a low-quality BVH using small size treelets. For example, n=7 provides (2n−3)!!=10395 (k!! denotes the double factorial, defined for odd k as k*(k−2)*(k−4)* . . . *3*1) unique ways for restructuring each treelet, and there are also many ways of forming the treelets. A small size treelet of n≥5 provides enough freedom during restructuring to prevent the optimization of the BVH from getting stuck prematurely.

Figure 2A:
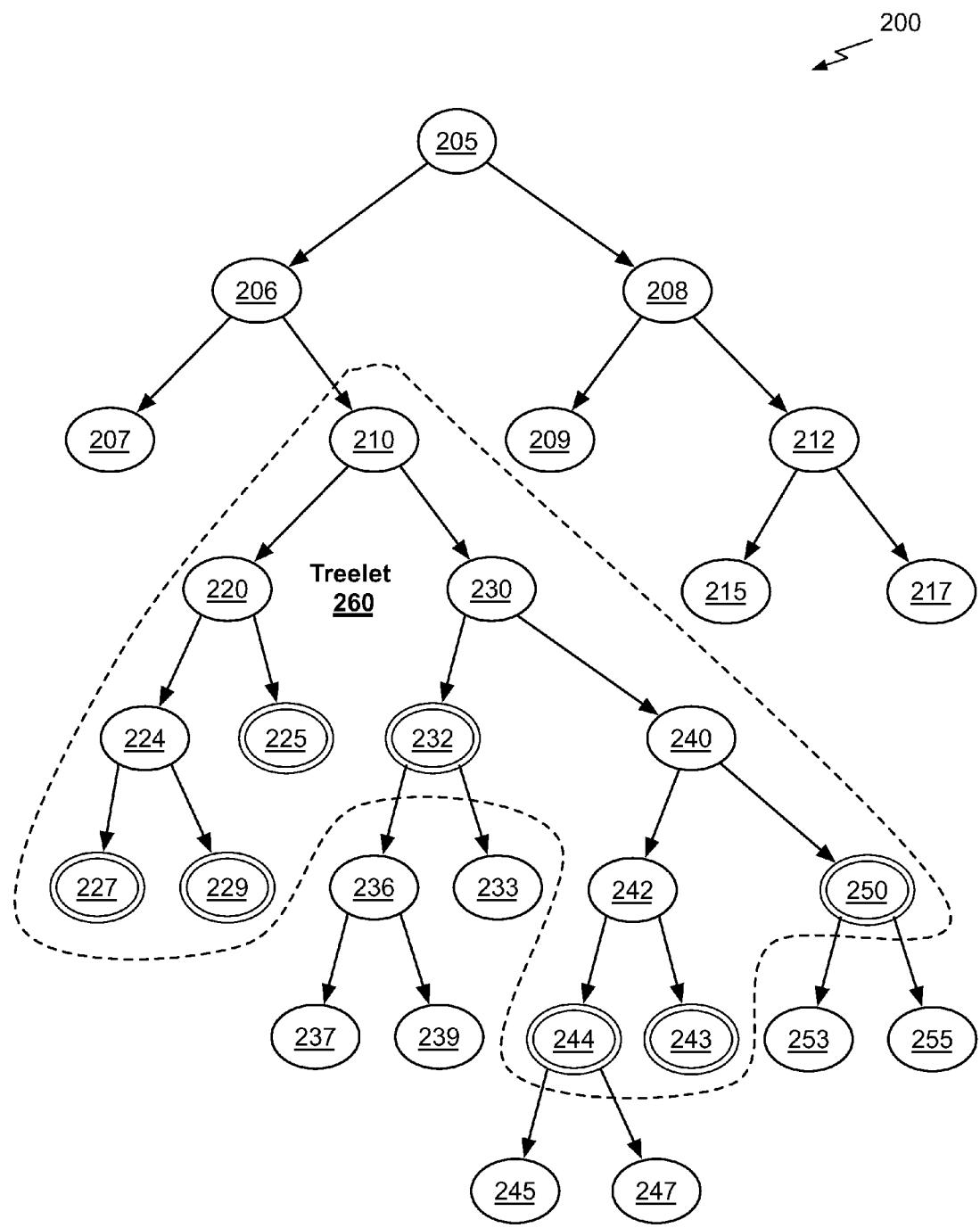
FIG. 2A illustrates a conceptual diagram of a hierarchical data structure represented by a tree, in accordance with one embodiment.

FIG. 2A illustrates a conceptual diagram of a hierarchical data structure represented by a tree 200, in accordance with one embodiment. The tree includes a treelet 260 of 7 treelet leaf nodes and 6 treelet internal nodes, including a root node 210. The nodes 205, 206, 208, and 212 and leaf nodes 207, 209, 215, and 217 are outside of the treelet 260. The leaf nodes of the treelet 260 can either be actual leaf nodes (e.g., 227, 229, 225, and 243) or arbitrary sub-trees (e.g., nodes 232, 244, and 250). The nodes 236, 237, 239, and 233 are descendants of the treelet leaf node 232 and form a subtree that is represented by the treelet leaf node 232. Similarly, the nodes 245 and 247 are descendants of the treelet leaf node 244 and form a subtree that is represented by the treelet leaf node 244. Finally, the nodes 253 and 255 are descendants of the treelet leaf node 250 and form a subtree that is represented by the treelet leaf node 250. Nodes 210, 220, 224, 230, 240, and 242 are the internal nodes of the treelet 260.

Figure 2B:
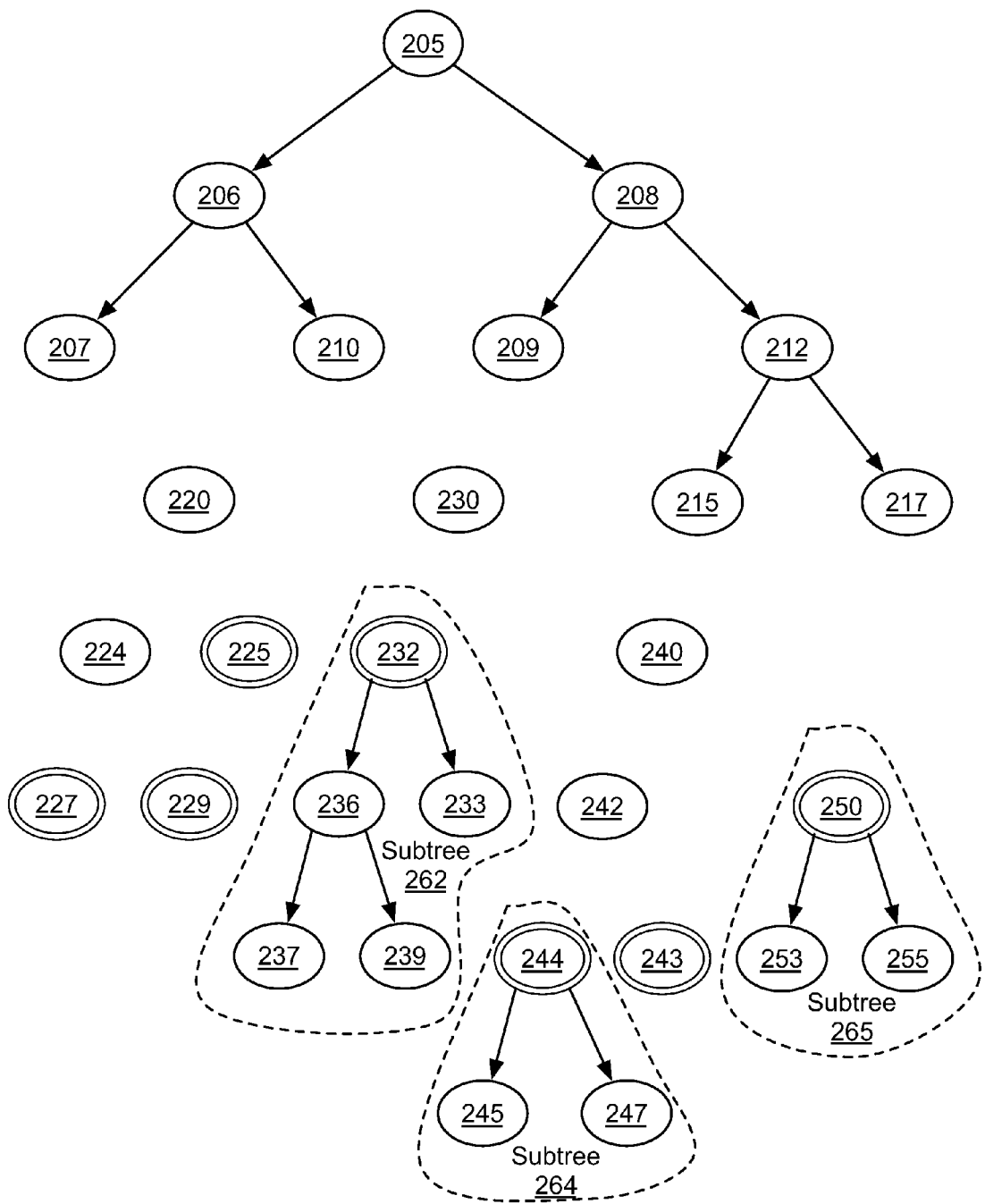
FIG. 2B illustrates a conceptual diagram of the hierarchical data structure represented by the tree of FIG. 2A during restructuring of a treelet, in accordance with one embodiment.
Figure 2C:
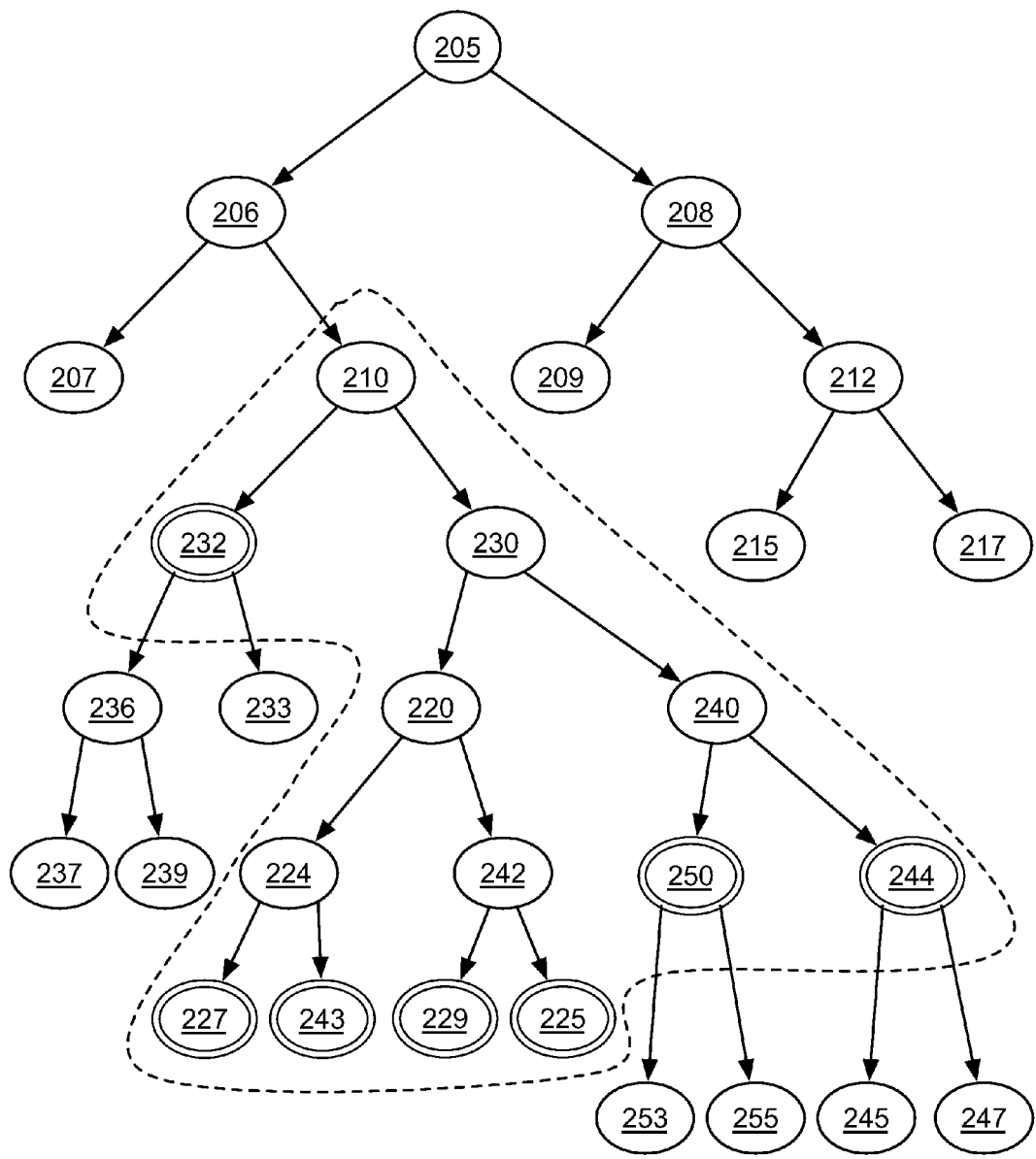
FIG. 2C illustrates a conceptual diagram of the hierarchical data structure represented by the tree of FIG. 2A after restructuring of the treelet, in accordance with one embodiment.

After the tree 200 representing a BVH is constructed, the treelet 260 is formed, and the topology of the treelet 260 and additional treelets may be restructured to produce the tree shown in FIG. 2C. The first step is to receive a treelet root node then through a "growing" process, the treelet leaf nodes are identified (e.g., internal, actual leaves, subtrees) to form a treelet, such as the treelet 260. Then, in a second step, the treelet may be restructured to produce a restructured treelet, as shown in FIGS. 2B and 2C.

To form the treelet 260, the root node 210 of the treelet 260 is identified and the child nodes 220 and 230 of the treelet root node 210 are designated as initial treelet leaves. For the purpose of treelet restructuring, the surface area of a treelet's internal nodes may provide a good indicator of the potential for reducing the SAH cost. Therefore, a goal of the treelet formation is to produce a treelet that maximizes the total surface area of the internal nodes. The formation may start with a small treelet including a treelet root and two treelet leaf nodes. The treelet is then grown iteratively, by choosing the treelet leaf node with the largest surface area and turning the chosen treelet leaf node into a treelet internal node. The treelet leaf node is converted into an internal node by removing the chosen treelet leaf node from the set of treelet leaf nodes and using the two children of the chosen node as new treelet leaf nodes. When this process is repeated, 5 iterations are needed to reach n=7.

The treelet 260 is grown by the following sequence of steps:

1. The initial treelet leaf nodes 220 and 230 are converted into treelet internal nodes. The node 220 has child nodes 224 and 225, and the node 230 has child nodes 232 and 240. Converting nodes 220 and 230 to treelet internal nodes turns the four nodes 224, 225, 232, and 240 into new treelet leaf nodes.
2. The treelet 260 may be further grown by converting one or more of the treelet leaf nodes 224, 232, 240 into treelet internal nodes. As shown in FIG. 2A, the treelet leaf node 240 is converted into a treelet internal node and the treelet leaf node 232 remains as a treelet leaf node having descendant nodes 236, 237, 239, and 233.
3. The child nodes of the treelet internal node 240 turn into new treelet leaf nodes 242 and 250.
4. The treelet leaf node 242 is further converted into a treelet internal node and the treelet leaf node 250 remains as a treelet leaf node having child nodes 253 and 255.
5. The child nodes of the treelet internal node 242 turn into new treelet leaf nodes 244 and 243.
6. The treelet leaf node 224 is converted into a treelet internal node and its child nodes 227 and 229 become new treelet leaf nodes.

As shown in FIG. 2A, the treelet 260 includes n=7 leaf nodes and n−1=6 internal nodes. The treelet 260 is a valid binary tree.

FIG. 2B illustrates a conceptual diagram of the hierarchical data structure represented by the tree 200 during restructuring of the treelet 260, in accordance with one embodiment. The topology of the treelet 260 and the additional treelets may be reorganized to minimize the overall SAH cost of the BVH. The treelet internal nodes 230, 220, 224, 240, and 242 may be reorganized to modify the topology of the treelet 260. The treelet leaf nodes 225, 227, 229, 232, 244, 243, and 250 may also be reorganized to modify the topology of the treelet 260.

Descendants of a treelet leaf node are kept intact, even when the location of the leaf node in the treelet 260 changes. For example, the topology of a first subtree 262 that includes the treelet leaf node 232 and the descendant nodes 236, 237, 239, and 233 is kept intact. Similarly, the topology of a second subtree 265 that includes the treelet leaf node 250 and the descendant nodes 253 and 255 is kept intact. The topology of a third subtree 264 that includes the treelet leaf node 244 and the descendant nodes 245 and 247 is also kept intact.

FIG. 2C illustrates a conceptual diagram of the hierarchical data structure represented by the tree 200 after restructuring of the treelet 260, in accordance with one embodiment. During restructuring, the topology of the treelet 260 is updated and the AABB values for the internal nodes are also updated. The set of children of all six treelet internal nodes (210, 230, 220, 240, 224, and 242) have been modified by the restructuring.

For example, as shown in FIG. 2A, the set of children for the treelet root node 210 includes treelet internal nodes 220 and 230. In FIG. 2C, the set of children for the treelet root node 210 includes treelet internal nodes 232 and 230. As shown in FIG. 2A, the set of children for the treelet internal node 230 includes treelet leaf node 232 and treelet internal node 240 and in FIG. 2C, the set of children for the treelet internal node 230 includes treelet internal nodes 220 and 240. As shown in FIG. 2A, the set of children for the treelet internal node 220 includes treelet leaf node 225 and treelet internal node 224 and in FIG. 2C, the set of children for the treelet internal node 220 includes treelet internal nodes 242 and 224. As shown in FIG. 2A, the set of children for the treelet internal node 240 includes treelet leaf node 250 and treelet internal node 242 and in FIG. 2C, the set of children for the treelet internal node 240 includes treelet leaf nodes 250 and 244. As shown in FIG. 2A, the set of children for the treelet internal node 224 includes treelet leaf nodes 227 and 229 and in FIG. 2C, the set of children for the treelet internal node 224 includes treelet leaf nodes 227 and 243. As shown in FIG. 2A, the set of children for the treelet internal node 242 includes treelet leaf nodes 227 and 229 and in FIG. 2C, the set of children for the treelet internal node 242 includes treelet leaf nodes 229 and 225.

The order of the treelet leaf nodes in the restructured treelet shown in FIG. 2C is changed compared with the initial treelet 200 shown in FIG. 2A. For example, the depth-first order of the treelet leaf nodes in FIG. 2A is 227, 229, 225, 232, 244, 243, and 250 and the depth-first order of the treelet leaf nodes in FIG. 2C is 232, 227, 243, 229, 225, 250, and 244.

Figure 3:
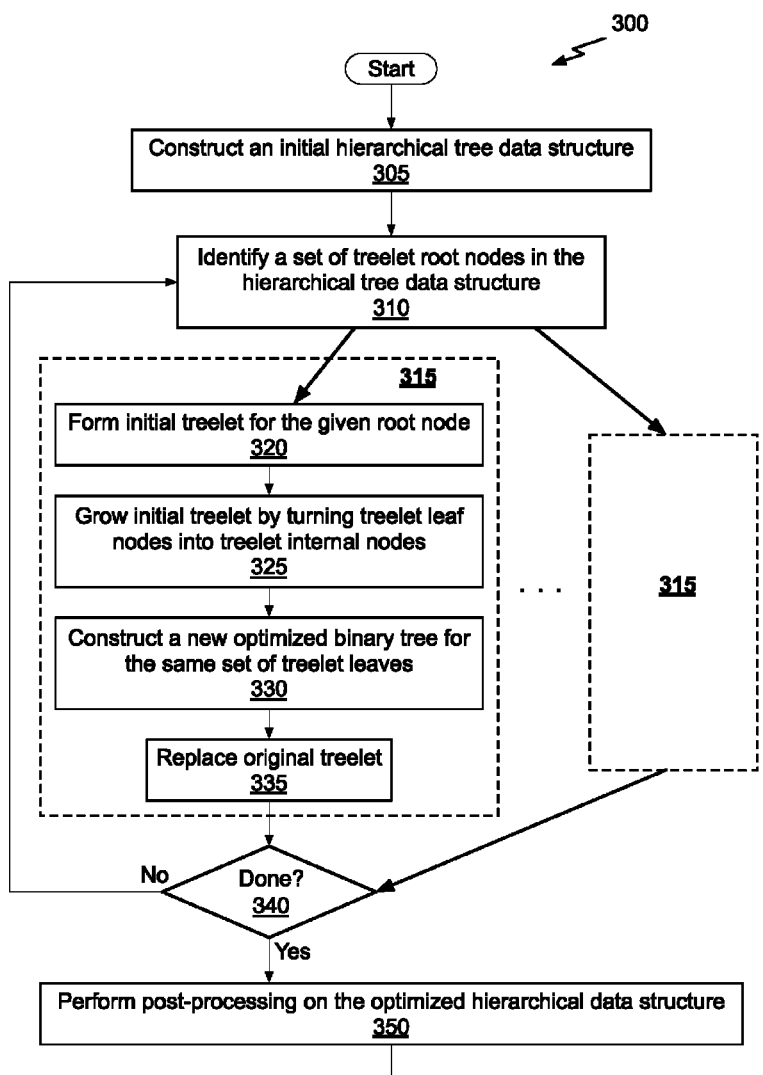
FIG. 3 illustrates another flowchart of a method for generating a hierarchical tree data structure, in accordance with one embodiment.

FIG. 3 illustrates another flowchart of a method 300 for generating a hierarchical tree data structure, in accordance with one embodiment. Although the method 300 is described in the context of a program executed by a processor, the method 300 may also be performed by custom circuitry or by a combination of custom circuitry and a program. At step 305, an initial hierarchical tree data structure is constructed by the processor. In one embodiment, the hierarchical tree data structure may be a BVH that is constructed using a method presented by Karras in 2012 using 60-bit Morton codes to ensure accurate spatial partitioning even for large scenes. The initial BVH stores a single primitive reference in each leaf node, and this property is maintained throughout the optimization of the BVH.

At step 310, a set of nodes to be used as treelet roots is identified. To identify the roots, the parallel bottom-up traversal algorithm presented by Karras in 2012 may be used. The algorithm works by traversing paths from the hierarchical tree data structure leaf nodes to the root in parallel, using atomic counters to terminate a first execution thread to enter any given node while allowing a second execution thread to proceed. The algorithm guarantees that the nodes are visited in a strict bottom up order: when a particular node is visited during the traversal, all of the node's descendants have already been visited. Therefore, the descendants may be restructured without the danger of other execution threads trying to access the descendants during the restructuring. The bottom-up traversal also provides a very natural way to propagate SAH costs of each node up the tree.

Step 315 includes steps 320, 325, 330, and 335. Step 315 may be performed by the processor in parallel to simultaneously form and restructure multiple treelets. At steps 320 and 325, the processor forms treelets of node neighborhoods in the hierarchical tree data structure (i.e., BVH), based on the treelet roots identified at step 310. Treelet formation includes identification of the treelet internal nodes and the treelet leaf nodes, including treelet leaf nodes representing subtrees, of each treelet. In one embodiment, each node of the hierarchical tree data structure is included in at most one of the multiple treelets that may be restructured concurrently.

At steps 330 and 335, a treelet and additional treelets are restructured in parallel by the processor to produce an optimized hierarchical tree data structure. The restructuring operates by first constructing a new binary tree (i.e., a restructured treelet) for the same set of treelet leaves. The new binary tree may replace the original treelet according to a cost function to produce an optimized treelet in the hierarchical data structure. The goal of the optimization is to minimize the SAH cost of the final tree that is produced by the optimization. Therefore, the new binary tree replaces the original treelet if a cost function (e.g., SAH cost) indicates that the optimized treelet improves the hierarchical tree data structure. Otherwise, the original treelet is retained. At step 340, the processor determines if the optimization of each treelet in the hierarchical tree data structure is complete, and, if so, the processor proceeds to step 350. The completion at step 340 may be based on, for example, a pre-defined number of iterations or changes in a cost metric of the hierarchical tree data structure.

Because the number of primitives in the leaf nodes of the hierarchical tree data structure is known to have a significant impact on ray tracing performance, any individual subtrees within a treelet are collapsed into treelet leaf nodes during the post-processing step 350.

The SAH cost, C(n) of a given subtree associated with a node may be calculated as the minimum over the two possible outcomes:

$$C(n) = \min \begin{cases} C_i A(n) + C(n_l) + C(n_r) & (n \in I) \\ C_t A(n) N(n) & (n \in L) \end{cases} \quad (2)$$

where n is the root of the subtree, $n_l$ and $n_r$ are its left and right child nodes, and N(n) indicates the total number of primitives contained in the subtree. The first case corresponds to making n an internal node, whereas the second case corresponds to collapsing the entire subtree into a single leaf node. In one embodiment, whichever alternative yields the lowest SAH cost may be chosen, so C(root)/A (root) gives the same result as Equation 1 for the final optimized hierarchical tree data structure. In practice, N(n) and C(n) may be initialized during the AABB fitting step of the initial BVH construction during step 305 and may be updated throughout the optimization.

The main benefit of selecting the alternative that yields the lowest SAH cost, is that the processing of leaf nodes and internal nodes is unified so that the same algorithm may be used for optimizing both—moving nodes in the treelets of the intermediate tree effectively enables refinement of the leaf nodes of the final hierarchical tree data structure that is produced by the optimization.

In one embodiment, the optimized hierarchical tree data structure that is produced should be readily usable with existing ray tracing kernels, such as the ray tracing kernel described by Aila et al. in 2012, the final post-processing stage performs several operations. At step 350, the post-processing should identify the subtrees to be collapsed into leaf nodes, collect the triangles of the identified subtrees into linear lists, and output the linear lists. In one embodiment, the triangles are represented in a format suitable for processing using Woop's intersection test. The subtrees may be identified by looking at the value of C(n) for each node. If the value corresponds to the second case in Equation 2, but the same is not true for the ancestors of n, the node is collapsed into a leaf node. The collapsing operation may be accomplished by traversing the subtree to identify the individual triangles, and then using an atomic counter to place them in the output array to produce the linear list.

Several different methods may be used to find the optimal topology for the nodes in the treelet for given treelet root during the optimization process. A naïve algorithm is described first, and then incremental refinements are made to the naïve algorithm to arrive at an efficient GPU implementation. Throughout the following description, a fixed treelet size of n=7 leaf nodes is used to illustrate various algorithmic details in concrete terms. However, in other embodiments, different values of n may be used, including values that are smaller or larger than 7.

FIG. 4A illustrates example code 400 of a function for performing step 330 of FIG. 3, in accordance with one embodiment. After forming a treelet of size n (steps 320 and 325), the treelet topology may be optimized (step 330). One method to accomplish this is to consider each possible binary tree in turn and choose the best one, as also described in conjunction with step 330 of the method 300.

As shown in FIG. 4A, a recursive function ConstructOptimalTree may be used to implement the function. The example code 400 constructs the optimal binary tree ($T_{opt}$) that minimizes the SAH cost ($c_{opt}$) for a given set of treelet leaf nodes (S). Each way of partitioning the leaf nodes is tried, so that some of the leaf nodes (P) are assigned to the left subtree of the root node while the rest of the leaf nodes (S\P) are assigned to the right subtree. The subtrees are, in turn, constructed by repeating the same process recursively.

The function ConstructOptimalTree takes set of treelet leaf nodes S as a parameter and returns the optimal tree $T_{opt}$ along with its SAH cost $c_{opt}$. If S consists of a single leaf, the function looks up the associated SAH cost and returns (lines 3-6). Otherwise, the function tries each potential way of partitioning the leaf nodes into two subsets (line 9). A partitioning is represented by set P that indicates which leaf nodes should go to the left subtree of the root; the rest will go the right subtree. For P to be valid, neither subtree can be empty (line 10).

For each partitioning, the algorithm proceeds to construct the subtrees in an optimal way by calling itself recursively (lines 12-13). It then calculates the SAH cost of the full tree obtained by merging the subtrees (lines 15-16). This corresponds to the first case of Equation 2, where the AABB of the root is calculated as the union of the AABBs in S. The algorithm maintains the best solution found so far in $T_{opt}$ and $c_{opt}$ (line 8), and replaces the best solution with the current solution if the current solution results in an improved SAH cost (lines 18-21).

In the end, $c_{opt}$ corresponds to the lowest SAH cost that can be obtained by creating at least one internal node, but it does not account for the possibility of collapsing the entire subtree into a single leaf node. As per the policy of maintaining one primitive per leaf node throughout the optimization, the collapsing is not performed until the final post-processing stage. However, the possibility of collapse is accounted for by evaluating the second case of Equation 2 at the end, and returning whichever of the two costs is lower (lines 25-28).

While the naïve algorithm shown in FIG. 4A is straightforward, it may be inefficient. For instance, n=7 results in a total of 1.15 million recursive function calls and an even larger number of temporary solutions that are immediately discarded afterwards. To transform the algorithm into a more efficient form that produces an identical result, the following three important modifications may be made:

1. Remove the recursion and perform the computation in a pre-determined order instead.
2. Represent S and P as bitmasks, where each bit indicates whether the corresponding leaf node is included in the set.
3. Memoize the optimal solution for each subset, using the bit masks as array indices.

The three modifications lead to a bottom-up dynamic programming approach. Because solutions to all subproblems are needed in order to solve the full problem, the small subproblems are solved first and the results are used to solve the larger problems. Given that the solution for subset S depends on the solutions for all $P \subset S$, a natural way to organize the computation is to loop over k=2 . . . n and consider subsets of size k in each iteration. Each subset of size k is a subproblem that is solved. In this manner, every iteration depends on the results of the previous iteration, but there are no dependencies within the iterations themselves.

FIG. 4B illustrates example code 420 for performing step 330 of FIG. 3 using dynamic programming, in accordance with one embodiment. In code 420, the full set of leaf nodes is represented as an ordered sequence L, and use bitmasks $\bar{s}$ and $\bar{p}$ to indicate which elements of L would be included in the corresponding sets S and P in the naïve variant shown in the example code 400. The algorithm starts by calculating the surface area of each potential internal node and storing the results in array a (lines 2-4). Calculating the AABBs has different computational characteristics compared to the other parts of the algorithm, so performing the AABB calculation in a separate loop is a good idea considering the parallel implementation.

The algorithm handles subsets corresponding to individual leaf nodes as a special case (lines 6-8). It then proceeds to optimize the remaining subsets in increasing order of size (lines 10-11). The optimal SAH cost of each subset is stored in array $c_{opt}$ and the corresponding partitioning is stored in an array, $\bar{p}_{opt}$. Keeping track of the different partitionings of the leaf nodes avoids the need to construct temporary trees—once all subsets have been processed, reconstructing the optimal tree is a matter of backtracking the choices recursively starting from $\bar{p}_{opt}[2^n-1]$.

Processing a given subset is very similar to the naive algorithm. Each possible way of partitioning the leaf nodes (lines 14-17) is tried, maintaining the best solution found so far in temporary variables $c_{\bar{s}}$ and $\bar{p}_{\bar{s}}$ (line 13). Then, the final SAH cost is calculated and the results are recorded in $c_{opt}$ and $\bar{p}_{opt}$ (lines 19-21). As an optimization, it may be observed that the first term of the SAH cost, $C_i \cdot a[\bar{s}]$, does not actually depend on which partitioning is chosen. Therefore, the first term of the SAH cost is omitted from the computation in the inner loop (line 15), and is instead included in the final cost (line 20).

Most of the computation happens in the inner loop (lines 14-17) of the example code 420. For each iteration of the loop two values are looked up from $c_{opt}$ and the temporary variables $c_{\bar{s}}$ and $\bar{p}_{\bar{s}}$ are updated. The complement of $\bar{p}$, corresponding to S\P, may be obtained conveniently through a logical XOR operation, because $\bar{p}$ can only contain bits that are also set in $\bar{s}$ (line 15). Looping over the different partitionings of the leaf nodes entails enumerating all integers that have the property that they only contain bits that are set in $\bar{s}$ (line 14). However, in addition to excluding 0 and $\bar{s}$, partitionings whose complements have already been tried should also be excluded. Complement partitionings result in mirror images of the same trees, and are thus irrelevant for the purposes of minimizing the SAH cost.

Figure 4C:
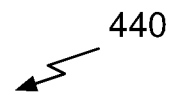
FIG. 4C illustrates example code for efficiently enumerating the partitionings, in accordance with one embodiment.

FIG. 4C illustrates example code 440 for efficiently enumerating the partitionings, in accordance with one embodiment. The example code 440 may be used to implement the inner loop (lines 14-17) of the example code 420 by utilizing the borrowing rules in two's complement arithmetic. The loop executes $2^{k-1}-1$ iterations in total, where k is the number of bits that are set ins.

The idea of the example code 440 is to clear the lowest bit of $\bar{s}$ and then step through the bit combinations of the resulting value $\bar{\delta}$. Clearing the lowest bit (line 1) means that the first leaf represented by $\bar{s}$ is assigned to the right subtree of the root, which is enough to avoid enumerating complements of the same partitionings of the leaf nodes. The successor of a given value is determined by utilizing the borrowing rules of integer subtraction in two's complement arithmetic (line 6). The initial value of $\bar{p}$ can be thought of as being the successor of zero (line 2). For a subset of size k, the loop executes $2^{k-1}-1$ iterations in total, after which $\bar{p}$ wraps back to zero.

Splitting Bounding Volumes of Primitives

As previously explained, splitting the bounding volumes of primitives may improve ray tracing performance. The splitting operations may be performed before construction of a BVH or during construction of the BVH. Dynamic splitting during BVH construction is a robust approach, and typically achieves high ray tracing performance. An approach for generating a split bounding volume hierarchy (SBVH), proposed independently by Stich et al. [2009] (SBVH) and Popov et al. [2009], is to incorporate triangle splitting directly into a top-down BVH construction algorithm. SBVH, which yields among the highest ray tracing performance to date, works by considering spatial splits in addition to conventional partitioning of triangles. Spatial splits correspond to duplicating triangles that intersect a given split plane, so that each resulting triangle reference lies strictly on either side of the plane. The choice between spatial splits and triangle partitioning is made on a per-node basis according to which alternative is the most effective in reducing the surface area heuristic (SAH) cost. However, dynamic splitting approaches, such as SBVH, rely on a specific kind of top-down construction method that runs well only on a CPU. While GPU-accelerated construction techniques can offer significant improvements in BVH construction time compared with the CPU-based construction techniques, incorporating dynamic splitting into GPU-accelerated construction techniques is challenging.

Pre-process splitting, on the other hand, is GPU-friendly and can be used in conjunction with any BVH construction technique. However, conventional pre-process splitting techniques suffer from the difficulty of being able to predict how a given split decision will affect the BVH that is constructed. As a consequence, conventional techniques require considerable manual effort to select the right parameters for each particular scene, and the conventional techniques can decrease ray tracing performance if the number of splits is too high.

Figure 5A:
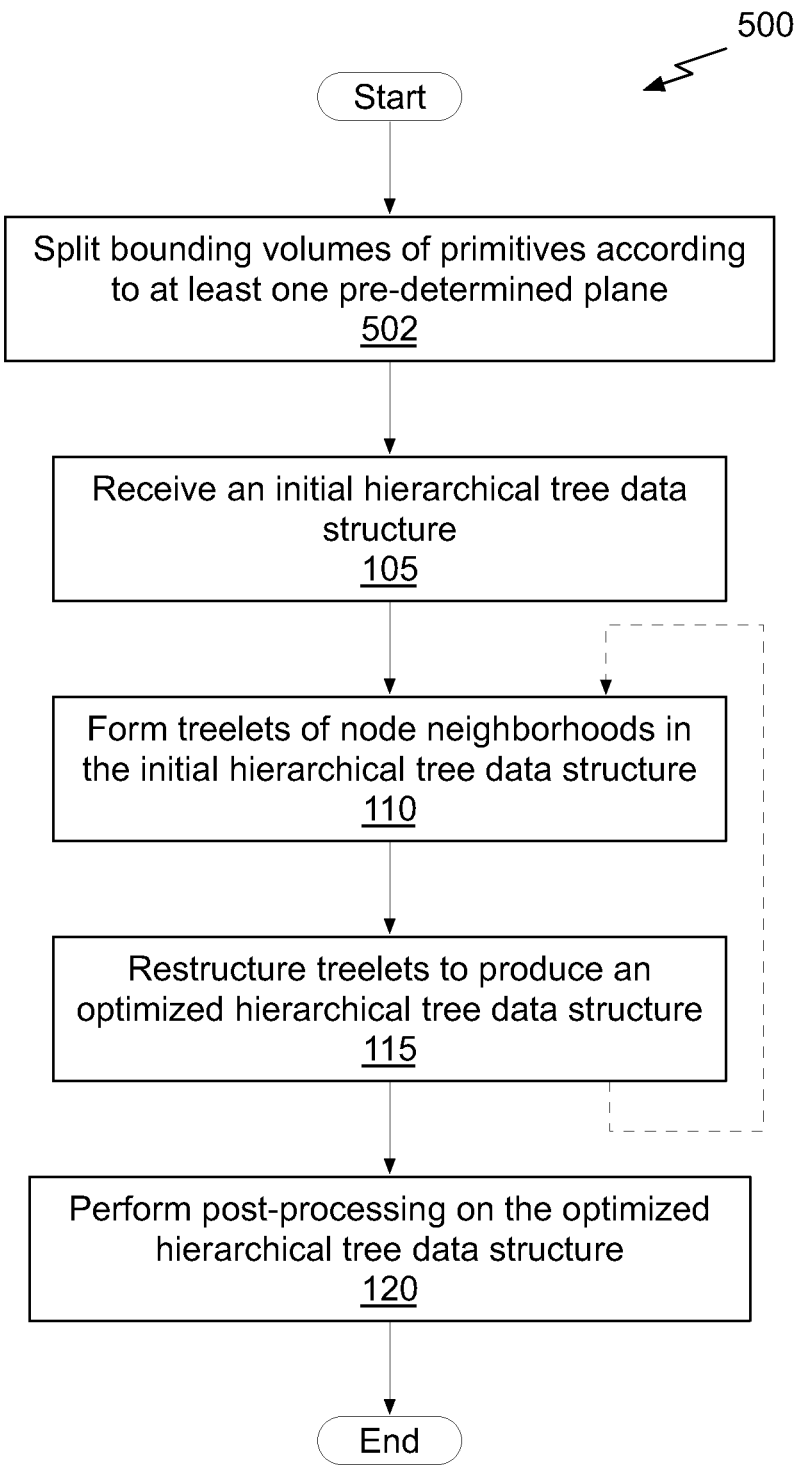
FIG. 5A illustrates another flowchart of a method for restructuring a hierarchical tree data structure, in accordance with one embodiment.

FIG. 5A illustrates another flowchart of a method 500 for restructuring a hierarchical tree data structure, in accordance with one embodiment. Although the method 500 is described in the context of a program executed by a processor, the method 500 may also be performed by custom circuitry or by a combination of custom circuitry and a program. At step 502, primitives in a three-dimensional scene are split according to at least one pre-determined (two-dimensional) plane that intersects the scene. A primitive is split by splitting a bounding volume that encloses the primitive to generate two smaller bounding volumes that collectively enclose the primitive. In the context of the following description, a bounding volume may include an axis-aligned rectangular bounding volume (i.e., a bounding box or AABB), a spherical bounding volume, or any other shape of closed surface and a primitive may include any graphics primitive, such as a triangle, polygon, patch, or the like. Primitives in the three-dimensional scene that are intersected by the pre-determined plane are split, where a bounding volume that encloses each intersected primitive is split into a first bounding volume and a second bounding volume at an intersection of the bounding volume and the pre-determined plane.

In the context of the following description, at least one pre-determined plane may be a spatial split plane that is aligned with two axes of a three-dimensional scene space defined by (x,y,z) coordinates. For example, a pre-determined plane may be aligned with the x and z axes, the x and y axes, or the y and z axes. The pre-determined plane may correspond to a partitioning plane used to construct the BVH, so that nodes of a hierarchical tree data structure are associated with bounding volumes that do not overlap the partitioning plane. In other embodiments, the scene may an N-dimensional scene where N is an integer greater than zero. The resulting set of bounding volumes that is produced by the splitting operation is used as the input for the BVH construction. Steps 105, 110, 115, and 120 are performed as previously described in conjunction with FIG. 1.

Splitting large triangles is important for achieving high ray tracing performance in scenes where the distribution of triangle sizes is non-uniform. In prior art techniques, each axis-aligned bounding box (AABB) is associated with a pointer to the triangle from which the AABB originated. Therefore, some triangles may be referenced by multiple AABBs of the BVH. The triangles themselves are not modified.

Figure 5B:
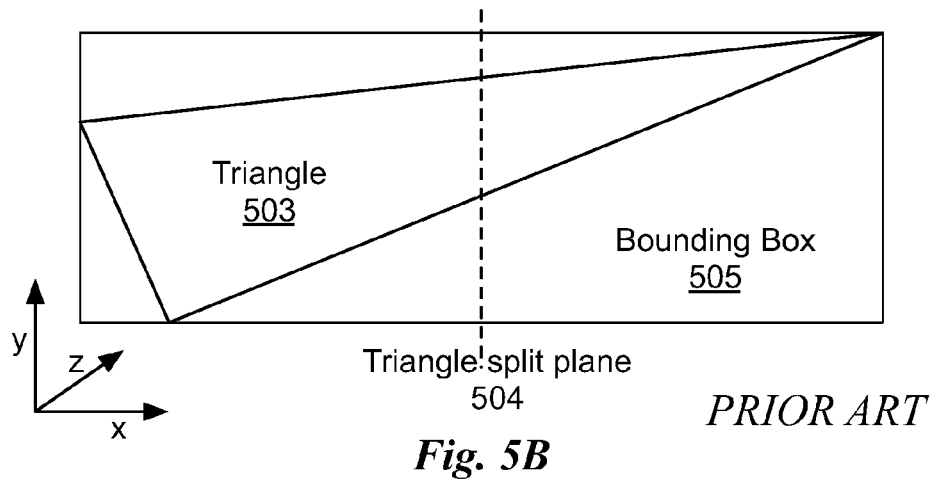
FIGS. 5B-E illustrate bounding box splitting techniques according to the prior art.

FIG. 5B illustrates a bounding box splitting technique according to the prior art. A bounding box 505 encloses a triangle 503. The triangle 503 and bounding box 505 are in three-dimensional space defined by the (x,y,z) axes. The technique proposed by Ernst and Greiner splits triangles along a longest axis (e.g., major axis) of the bounding box if the surface area exceeds a pre-defined threshold. Dammertz and Keller propose a similar scheme to split triangle edges based on the volume of their axis-aligned bounding boxes. As shown in FIG. 5B, the bounding box 505 is split along the major axis by a triangle split plane 504 that intersects the major axis at the halfway point.

Figure 5C:
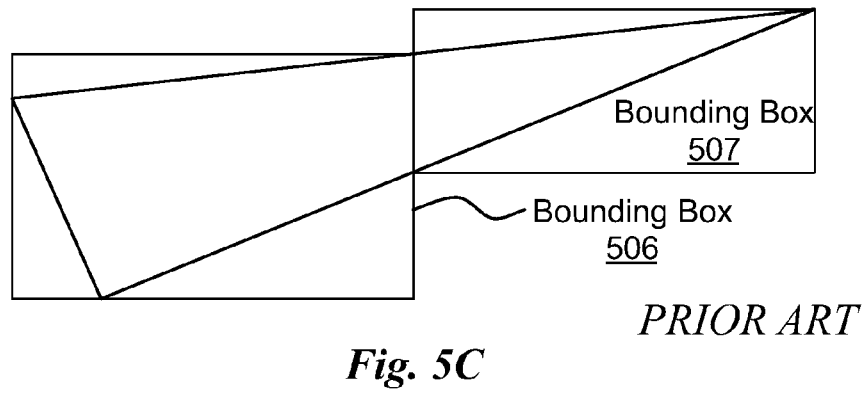

FIG. 5C illustrates the bounding boxes resulting from the splitting technique, according to the prior art. The bounding boxes resulting from the split of bounding box 505 are reduced in width and/or height to closely enclose the triangle 503. As shown in FIG. 5C, the bounding boxes 506 and 507 enclose the triangle 503, and, if the surface area of the bounding boxes 506 and/or 507 exceeds the pre-defined threshold, the bounding boxes 506 and/or 507 may be split to generate additional bounding boxes for the triangle 503.

Figure 5D:
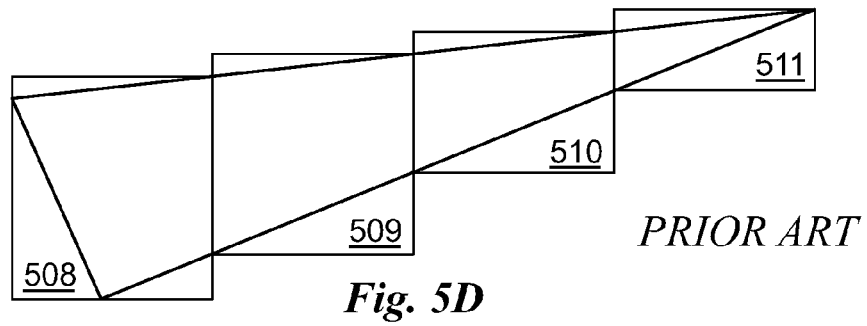
Figure 5E:
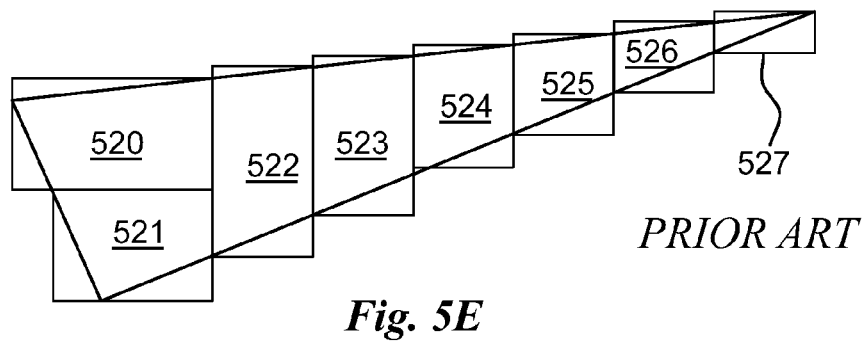

FIG. 5D illustrates bounding boxes 508, 509, 510, and 511 resulting when the splitting technique is applied to the bounding boxes 506 and 507 of FIG. 5C, according to the prior art. FIG. 5E illustrates bounding boxes 520, 521, 522, 523, 524, 525, 526, and 527 resulting when the splitting technique is applied to the bounding boxes 508, 509, 510, and 511 of FIG. 5D, according to the prior art. As shown in FIGS. 5B, 5C, 5D, and 5E, the bounding boxes are split halfway along the major axis. The technique is applied to each triangle individually, independent of the other triangles in the scene. Therefore, it is unlikely that the planes used to split a bounding box of one triangle will align with the plane used to split a bounding box of a different triangle. It is also unlikely that the planes used to split a bounding box will align with partitioning planes used to construct the BVH. In contrast, when bounding volumes of primitives in a scene are split using one or more pre-determined planes that are also used to construct the BVH, node overlap is reduced and ray tracing performance may be improved, as described further herein. In one embodiment, the average improvement of ray tracing performance is 20% when splitting is performed using pre-determined planes that are also used to construct the BVH.

Figure 6A:
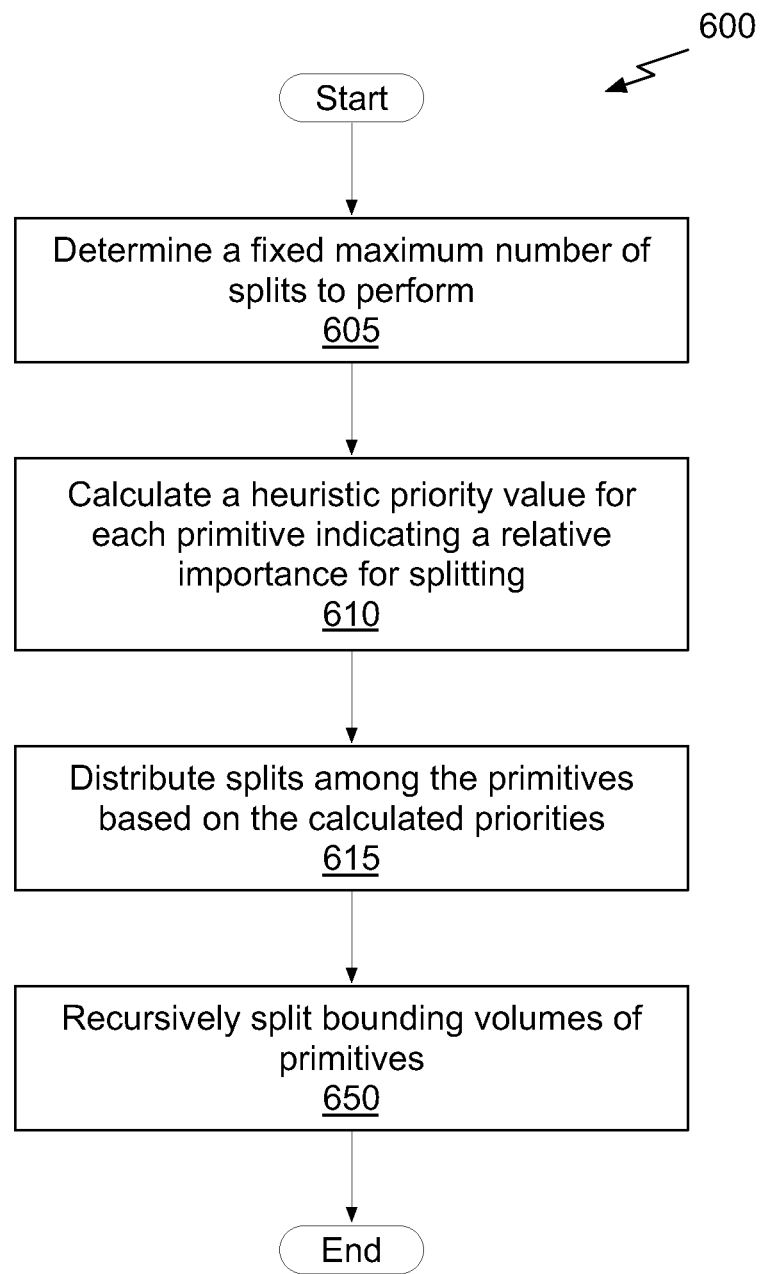
FIG. 6A illustrates a flowchart of a method for splitting bounding volumes of primitives, in accordance with one embodiment.

FIG. 6A illustrates a flowchart of a method 600 for splitting bounding volumes of primitives, in accordance with one embodiment. Although the method 600 is described in the context of a program executed by a processor, the method 600 may also be performed by custom circuitry or by a combination of custom circuitry and a program. At step 605, a fixed maximum number of splits to perform for a scene is determined. An amount of memory may be allocated in order to store the data that is generated for the fixed maximum number of splits. At step 610, a heuristic priority value is calculated for each primitive, where the heuristic priority value indicates a relative importance for splitting the primitive compared to other primitives in the scene. At step 615, splits are distributed among the primitives based on the calculated priorities, as described in detail in conjunction with FIG. 7A. The number of splits that are distributed does not exceed the fixed maximum number of splits determined at step 605. At step 650, the bounding volumes of the primitives are recursively split according to the distributed splits, as described in detail in conjunction with FIG. 7B.

The primitive splitting technique performed using the method 600 reduces node overlap by splitting a large group of primitives using the same pre-determined split plane. For example in the case of method 500, by virtue of constructing an initial BVH using spatial median partitioning, the split planes that are going to be the most relevant are known. For example the root node of the initial BVH partitions the scene into two equal halves according to the spatial median of its x-axis. When a bounding volume of a given primitive is intersected by a spatial median plane used to construct the BVH, the two children of the root node will overlap. Since the nodes near the root are likely to have a significant impact on the ray tracing performance, it is beneficial to avoid overlap of bounding volumes between two or more sibling nodes.

Figure 6B:
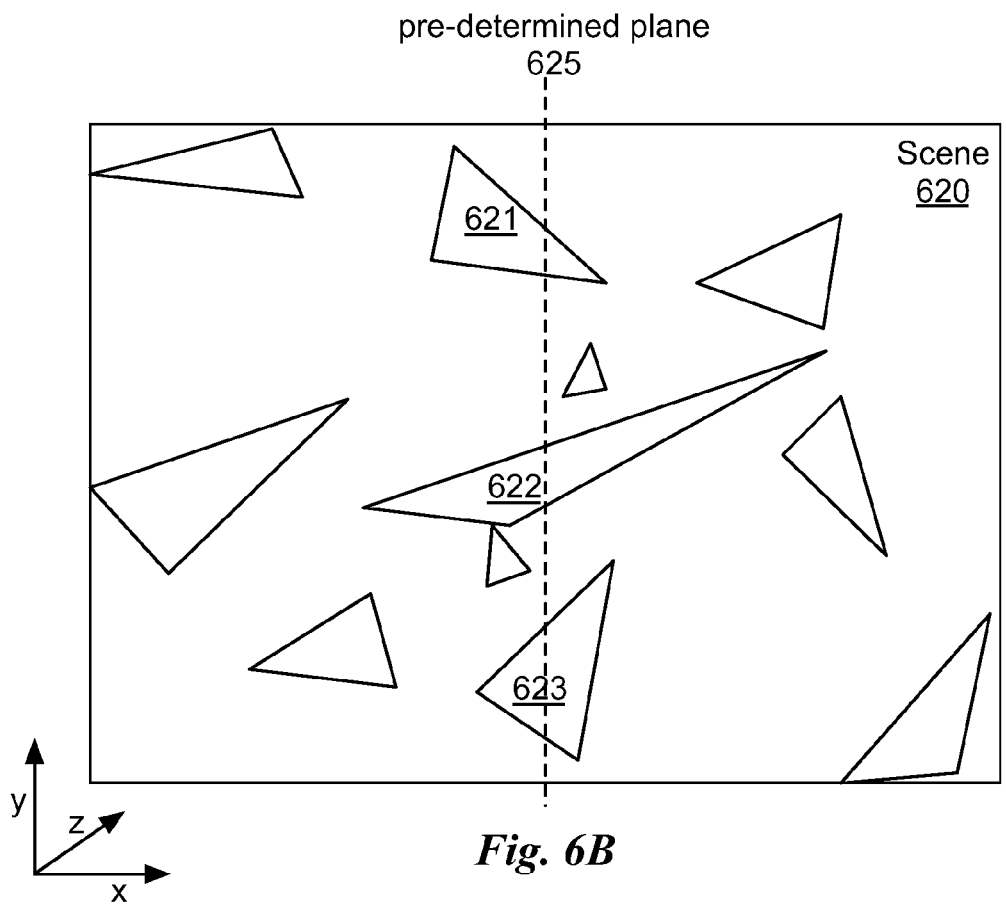
FIG. 6B illustrates a scene including primitives and a pre-determined plane, in accordance with one embodiment.

FIG. 6B illustrates a scene 620 including primitives and a pre-determined plane 625 that intersects the scene 620, in accordance with one embodiment. In one embodiment, the pre-determined plane 625 is a two-dimensional spatial median plane that intersects the three-dimensional scene 620 defined by the (x,y,z) coordinates, as shown in FIG. 6B. More precisely, the pre-determined plane 625 bisects the scene 620, dividing the scene 620 into two equal sized halves. The pre-determined plane 625 intersects the primitives 621, 622, and 623 that are defined by the (x,y,z) coordinates. In contrast with prior art techniques, the pre-determined plane 625 bisects the scene 620 to split primitives that are intersected by the pre-determined plane 625 instead of using triangle-specific split planes to intersect the largest triangles in the scene. Also, if possible, all of the primitives that are intersected by the pre-determined plane 625 should be split, not just one primitive.

Figure 6C:
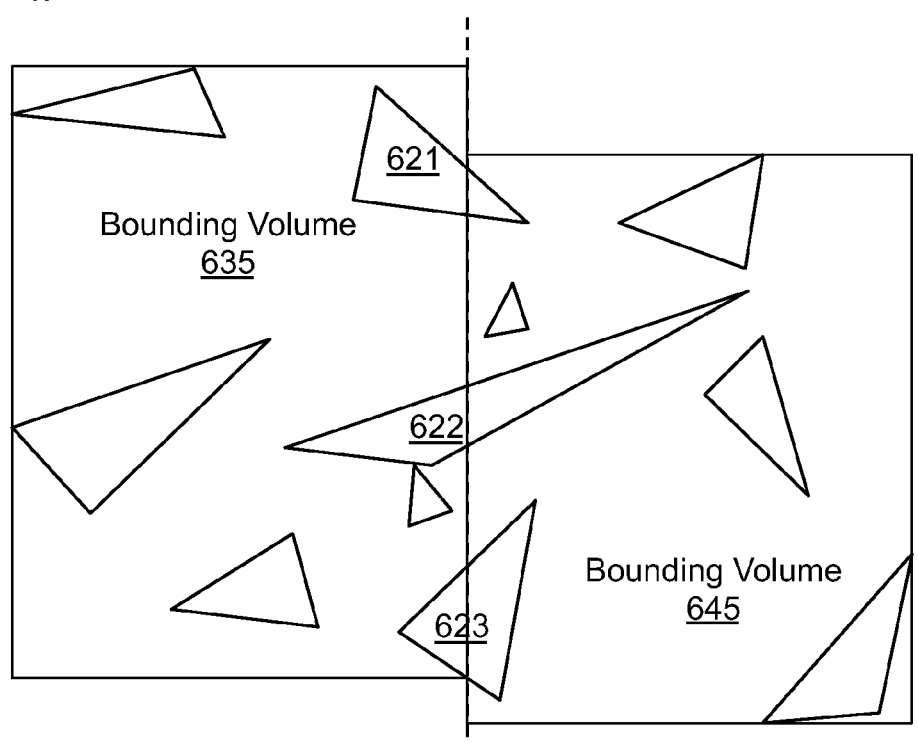
FIG. 6C illustrates the scene including primitives split by the pre-determined plane to produce two non-overlapping bounding volumes, in accordance with one embodiment.

FIG. 6C illustrates the scene 620 including primitives 621, 622, and 623 that are split by the pre-determined plane 625 to produce two non-overlapping bounding volumes 635 and 645, in accordance with one embodiment. The bounding volumes 635 and 645 are shown as AABBs in FIG. 6C and each have a face that is coincident with the pre-determined plane 625. Similarly, a bounding volume of the primitive 622 that is intersected by the pre-determined plane 625 is split into a first bounding volume having a face coincident with the pre-determined plane 625 and a second bounding volume having a face coincident with the pre-determined plane 625. In other embodiments, the bounding volumes 635 and 645 may be shapes other than a bounding box and are not necessarily axis-aligned bounding volumes.

Bounding volumes of the primitives 621, 622, and 623 are split and each bounding volume that is generated references the corresponding primitive 621, 622, and 623. Splitting the primitive 622 is described in detail in conjunction with FIGS. 6E and 6F. When a BVH is constructed, a first subtree whose root corresponds to the bounding volume 635 references the primitives that are at least partially included within the bounding volume 635 and a second subtree whose root corresponds to the bounding volume 645 references the primitives that are at least partially included within the bounding volume 645. The primitives 621, 622, and 623 are referenced by both the first and second subtrees.

Figure 6D:
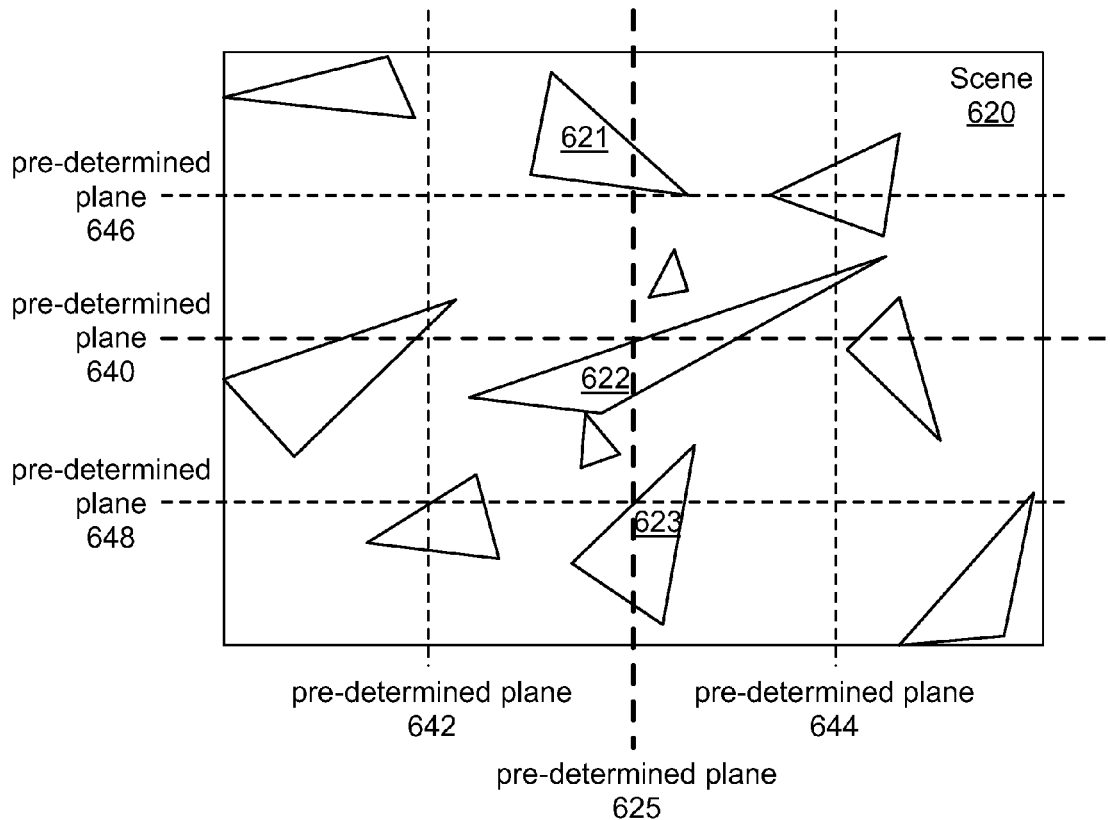
FIG. 6D illustrates the scene of FIG. 6B split by a set of pre-determined planes, in accordance with one embodiment.

FIG. 6D illustrates the scene 620 of FIG. 6B split by a set of pre-determined planes including the pre-determined plane 625, in accordance with one embodiment. The set of pre-determined planes also includes pre-determined planes 642, 644, 646, 640, and 648. It is beneficial to split the primitives in the scene 620 using the same set of pre-determined planes in order to effectively reduce the overlap between nodes in the BVH. The different pre-determined planes each correspond to levels, so that a primitive that is intersected by multiple pre-determined planes is split recursively based on the levels of the intersecting pre-determined planes. For example, the pre-determined planes 625, 640, 642, 644, 646, and 648 may correspond to the levels 0, 1, 2, 2, 3, and 3, respectively, and splits are performed in an increasing level order, where the levels indicate a decreasing order of importance.

The set of pre-determined planes may correspond to the spatial median planes. In one embodiment, when a given primitive that is intersected by multiple pre-determined spatial median planes, the most important pre-determined spatial median plane is identified and used to split the bounding volume of the primitive. For example, for a scene extending over the range [0,1] along each axis (x,y,z), the spatial median planes in the set of pre-determined planes are given by $x=j\cdot 2^i$ where $i,j \in \mathbb{Z}$ and similarly for y and z. The value of i is negative, and values closer to zero correspond to more important planes. In practice, an efficient way to choose the split plane is to form two Morton codes based on the minimum and maximum coordinates of the bounding volume, and then find the highest bit that differs between them, as described by Karras [2012]. In one embodiment, the spatial median planes in the set of pre-determined planes correspond to x=0.5, y=0.5, z=0.5, then x=0.25, x=0.75, y=0.25, . . . , then x=0.125, x=0.375, and so on. Because neighboring primitives are likely to intersect the same spatial median planes in the set of pre-determined planes, splits that are performed for a given primitive are likely to be performed for neighboring primitives.

As shown in FIG. 6D, the primitive 623 is intersected by the pre-determined planes 625 and 648 and is split by the pre-determined plane 625 (level 0) before being split by the pre-determined plane 648 (level 3). The primitive 622 is intersected by the pre-determined planes 625, 640, and 644 and is split by the pre-determined plane 625 (level 0) before being split by the pre-determined plane 640 (level 1) and then being split by the pre-determined plane 644 (level 2). A pre-determined plane at a lower level is considered more important and is dominant relative to a pre-determined plane at a higher level. Therefore, each time a primitive will be split, the dominant pre-determined plane is identified to perform the split.

Figure 6E:
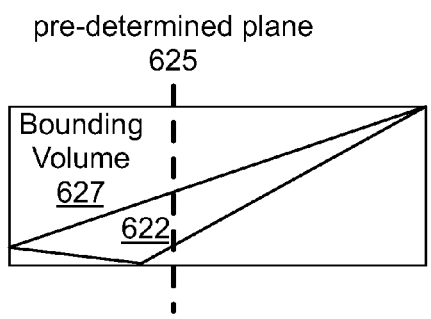
FIG. 6E illustrates a bounding volume of a primitive that is split by the pre-determined plane of FIG. 6B, in accordance with one embodiment.
Figure 6F:
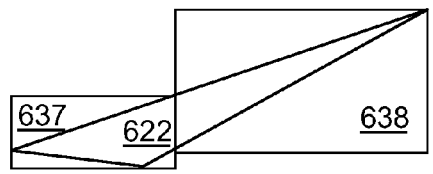
FIG. 6F illustrates two bounding volumes generated when the primitive of FIG. 6E is split, in accordance with one embodiment.

As shown in step 650 of the method 600 in FIG. 6A, after the splits for a scene are distributed among the primitives, each primitive is recursively split. FIG. 6E illustrates a bounding volume 627 of the primitive 622 that is split by the pre-determined plane 625 of FIG. 6B, in accordance with one embodiment. FIG. 6F illustrates two bounding volumes 637 and 638 that are generated when the primitive 622 of FIG. 6E is split, in accordance with one embodiment. When more than one split is allocated to the primitive 622, the bounding volume 637 and/or 638 is also split to generate additional bounding volumes. Splitting the primitive 622 reduces the size of the bounding volumes that enclose the primitive 622 so that the number of ray-primitive intersection tests that are performed during ray traversal is reduced, improving ray tracing performance.

The number of splits that are allocated to a primitive in a scene is based on the calculated heuristic priority for the primitive and can be as low as zero. A given primitive should be split if it crosses an important pre-determined plane or if the surface area of the bounding volume of the primitive can be significantly decreased. Therefore, these two factors are combined into the priority calculation that is used to compute a heuristic priority value, $p_t$, for each primitive. Because pre-process splitting is fundamentally an underdetermined problem, it is difficult to define the priority in a principled way. However, in one embodiment, the following formula has been found to be robust.

$$p_t = (X^i \cdot (A_{bv} - A_{ideal}))^Y,$$

where i is the importance of the dominant spatial median plane intersected by the primitive, $A_{bv}$ is the surface area of the original bounding volume, and X and Y are free parameters. In one embodiment, X=2 and Y=⅓ have been found to produce satisfactory results.

To estimate how much the representation of a particular primitive can be improved, the lowest total surface area $A_{ideal}$ of the representative bounding volumes that can be reached through splitting is calculated. Assuming that the number of splits is taken to the limit, the primitive is essentially represented as a collection of infinitesimal bounding volumes. For any axis-aligned projection (±x, ±y, ±z), the surface area of a projected triangle equals the sum of surface areas of the corresponding face of the bounding volumes assuming the bounding volumes are AABBs. The total surface area of the bounding volumes may be expressed as $A_{ideal} = \|d_1 \times d_2\|_1$, where $d_1$ and $d_2$ are edge direction vectors of the triangle and $\|\cdot\|_1$ indicates the $L^1$ norm. Each component of the cross product is equal to twice the area of a particular 2D projection. As a consequence, the result essentially represents the sum of 6 such areas, one for each face of the AABB.

Most of the splits should be concentrated on primitives for which both i and $A_{bv} - A_{ideal}$ are high. In general, a fairly low value should be used for Y to avoid spending the entire split budget for the scene on a few large primitives in pathological cases. The entire split budget for the scene should not exceed the fixed maximum number of splits that is determined at step 615 of the method 600 shown in FIG. 6A.

The fixed maximum number of splits, $s_{max}$, may be determined using a parameter β using the following equation:

$$s_{max} = \lfloor \beta \cdot m \rfloor,$$

where m is the number of primitives in the scene. Limiting the total number of splits for a scene results in predictable memory consumption, and also avoids the need for dynamic memory allocation for animated scenes.

To determine how to distribute the fixed maximum number of splits among the primitives, the heuristic priority $p_t$ for a particular primitive is multiplied with an appropriately chosen scale factor D and the result is rounded to compute the number of splits for the primitive, $s_t$. In one embodiment, the equation for computing $s_t$ is:

$$s_t = \lfloor D \cdot p_t \rfloor.$$

To fully utilize the fixed maximum number of splits, D is chosen to be as large as possible while still satisfying $\Sigma s_t \leq s_{max}$.

Figure 7A:
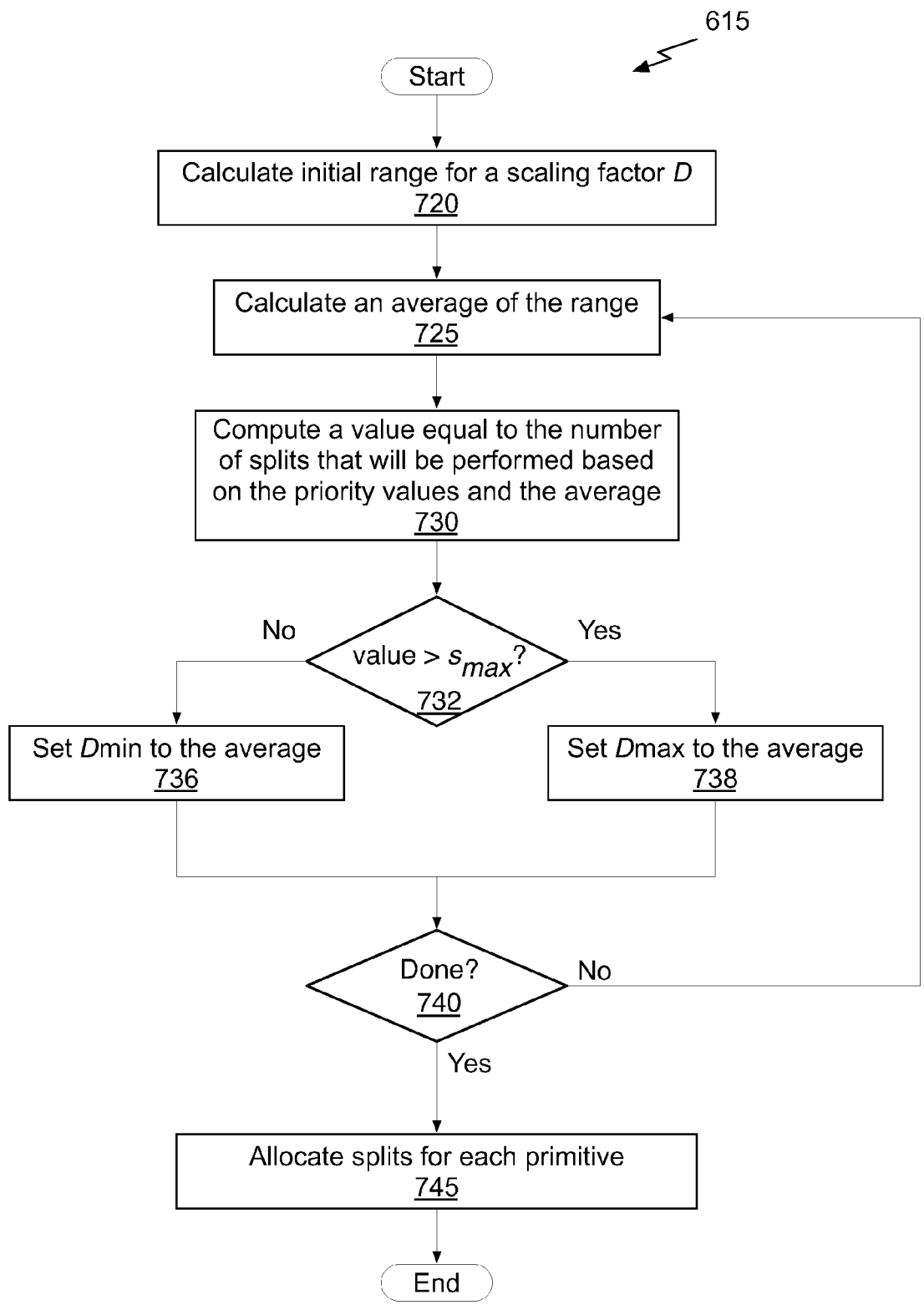
FIG. 7A illustrates a flowchart of a method for distributing the splits among the primitives, in accordance with one embodiment.

FIG. 7A illustrates a flowchart of a method for performing step 615 shown in FIG. 6A to distribute a total number of splits among the primitives, in accordance with one embodiment. Although the steps shown in FIG. 7A are described in the context of a program executed by a processor, the steps shown in FIG. 7A may also be performed by custom circuitry or by a combination of custom circuitry and a program. At step 720, an initial range for the scaling factor D is computed with conservative bounds $D_{min}$ and $D_{max}$. A bisection technique may be used to refine the bounds iteratively and compute the scaling factor D. The initial lower bound $D_{min}$ may be calculated based on the sum of primitive priorities and the upper bound $D_{max}$ may be computed by adjusting $D_{min}$ based on how many splits would result from using $D_{min}$. In one embodiment, $D_{min}$ and $D_{max}$ are computed as:

$$D_{min} = s_{max} / \Sigma p_t \text{ and}$$

$$D_{max} = D_{min} \cdot s_{max} / \Sigma \lfloor D_{min} \cdot p_t \rfloor.$$

At step 725, an average of the range of the scaling factor D is calculated, where $D_{avg} = (D_{min} + D_{max})/2$. At step 730, a value equal to the total number of splits that will be performed based on distributing the splits using $D_{avg}$ and the priority values is computed. In one embodiment, the value may be computed as $\Sigma \lfloor D_{avg} \cdot p_t \rfloor$. At step 732, the processor determines if the value is greater than fixed maximum number of splits $s_{max}$. When the value is not greater than $s_{max}$, at step 736, $D_{min}$ is set to $D_{avg}$. When the value is greater than $s_{max}$, at step 738, $D_{max}$ is set to $D_{avg}$.

At step 740, the processor determines if the computation of D is complete. In one embodiment, six rounds of bisection are performed to compute D so that the number of splits performed is within 1% of $s_{max}$. When the computation of D is complete, D is set equal to $D_{min}$. At step 745, the processor distributes the total number of splits to the primitives by allocating a number of splits to each primitive in the scene. The number of splits allocated to each primitive is based on D and the computed priority for the primitive.

The splits may be performed by maintaining a set of split tasks, each specifying how many times a particular bounding volume for a primitive should be split. To process a task, the bounding volume is split according to a heuristically chosen pre-determined plane. The remaining splits allocated to a primitive are then distributed amongst the two resulting bounding volumes proportional to the lengths of the longest axes of the two resulting bounding volumes. Denoting these lengths with $w_a$ and $w_b$ and the original number of splits allocated to the primitive with s, $$s_a = \left\lfloor \frac{(s-1)w_a}{w_a + w_b} + 1/2 \right\rfloor$$

splits for the first bounding volume and $s_b = s - 1 - s_a$ for the second bounding volume. When either of the number of splits (e.g., $s_a$ and/or $s_b$) distributed to the resulting bounding volumes is non-zero, a new task is created for the corresponding bounding volume and the bounding volume is processed in the same fashion. In practice, the split tasks may be processed in parallel.

Figure 7B:
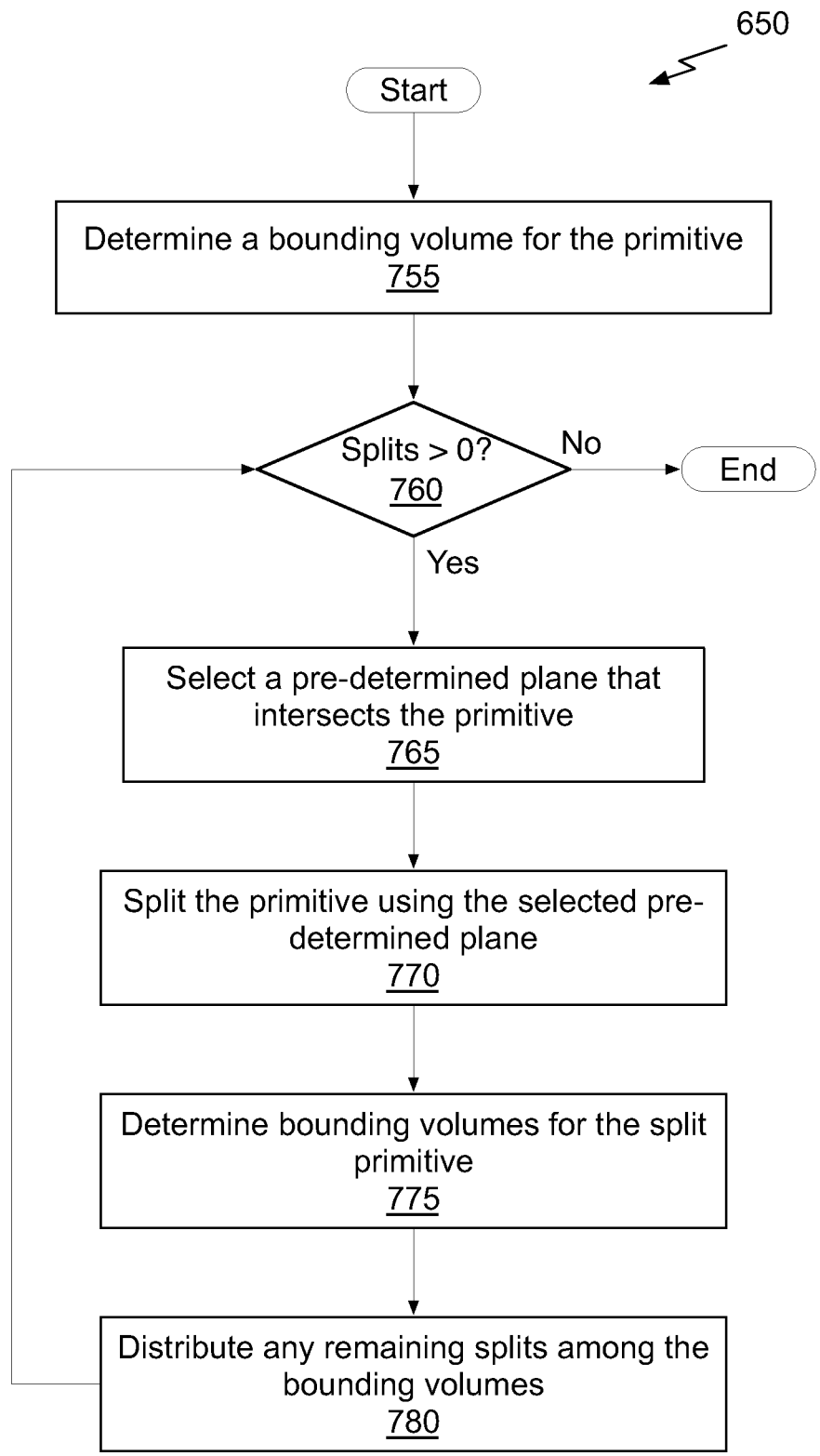
FIG. 7B illustrates a flowchart of a method for splitting the bounding volume of a primitive, in accordance with one embodiment.

FIG. 7B illustrates a flowchart of a method for performing step 650 shown in FIG. 6A to split the bounding volume of a primitive, in accordance with one embodiment. Although the steps shown in FIG. 7B are described in the context of a program executed by a processor, the steps shown in FIG. 7B may also be performed by custom circuitry or by a combination of custom circuitry and a program. At step 755, a bounding volume is determined for the primitive to be split. At step 760, the processor determines if the number of splits allocated to the primitive is greater than zero, and if not, the method terminates. Otherwise, at step 765 a pre-determined plane that intersects the primitive is selected. As previously explained, the dominant two-dimensional plane may be selected when the primitive is intersected by multiple pre-determined planes.

At step 770, the primitive is split by splitting a bounding volume that encloses the primitive using the selected pre-determined plane to generate two bounding volumes that enclose the primitive. At step 775, bounding volumes resulting from the split are determined. At step 780, any remaining splits are distributed among the bounding volumes resulting from the split. The processor then returns to step 760 for each resulting bounding volume in a recursive fashion, to determine if another split will be performed. The steps 760, 765, 770, 775, and 780 are repeated until the remaining number of splits allocated to the primitive is reduced to zero to recursively split the primitive.

The primitive splitting technique reduces node overlap by splitting a large group of primitives using the same pre-determined split plane. Bounding volumes that are intersected by multiple pre-determined split planes are recursively split by the multiple pre-determined split planes according to the relative importance of the multiple pre-determined split planes. Therefore, node overlap is avoided for the nodes corresponding to the bounding volumes that are closest to the root node and have a greater impact on the ray tracing performance.

Processing System

Figure 8:
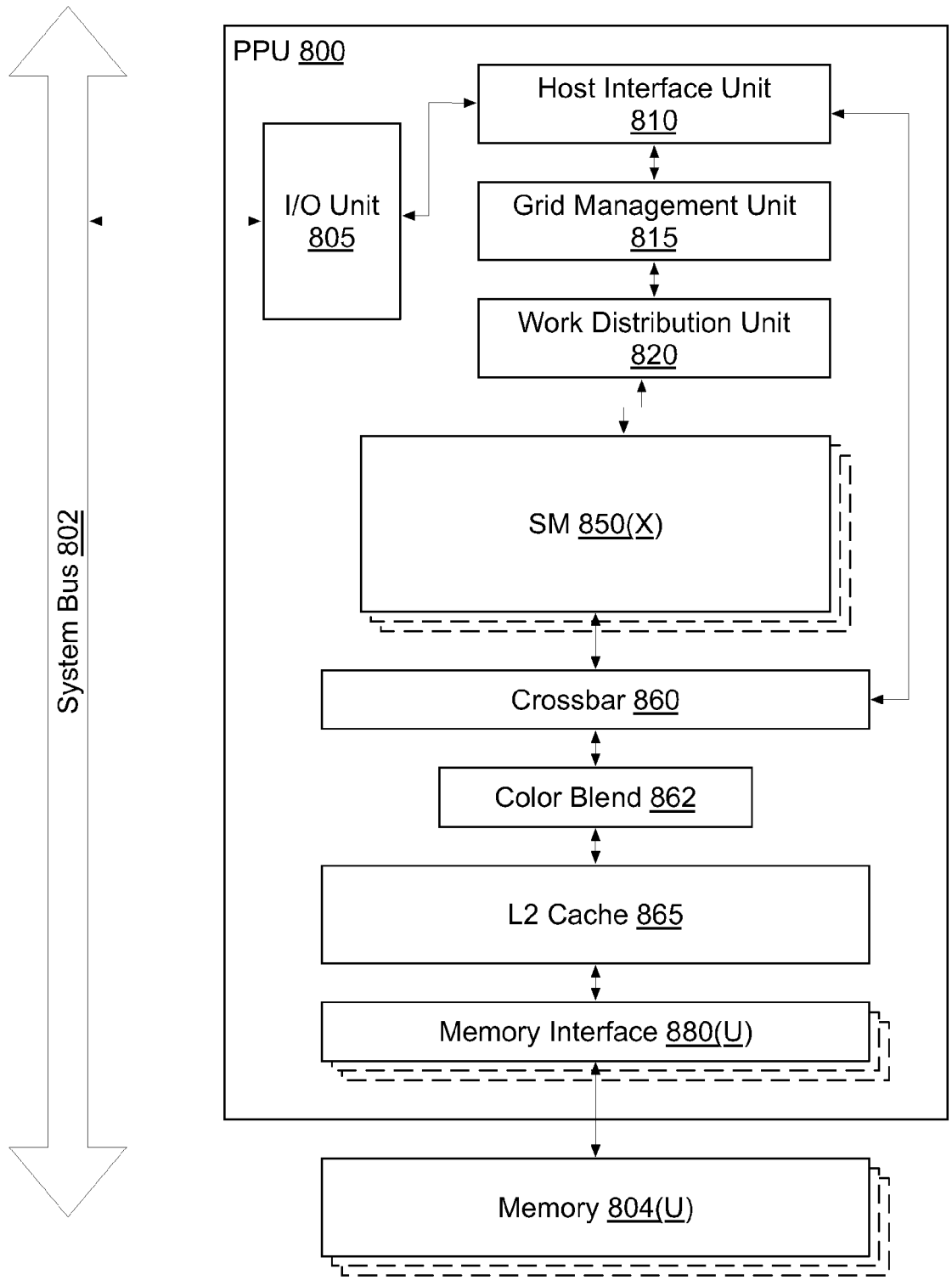
FIG. 8 illustrates a parallel processing unit (PPU), according to one embodiment.

FIG. 8 illustrates a parallel processing unit (PPU) 800, according to one embodiment. While a parallel processor is provided herein as an example of the PPU 800, it should be strongly noted that such processor is set forth for illustrative purposes only, and any processor may be employed to supplement and/or substitute for the same. In one embodiment, the PPU 800 is configured to execute a plurality of threads concurrently in one or more streaming multi-processors (SMs) 850. A thread (i.e., a thread of execution) is an instantiation of a set of instructions executing within a particular SM 850. Each SM 850, described below in more detail in conjunction with FIG. 9, may include, but is not limited to, one or more processing cores, one or more load/store units (LSUs), a level-one (L1) cache, shared memory, and the like.

In one embodiment, the PPU 800 includes an input/output (I/O) unit 805 configured to transmit and receive communications (i.e., commands, data, etc.) from a central processing unit (CPU) (not shown) over the system bus 802. The I/O unit 805 may implement a Peripheral Component Interconnect Express (PCIe) interface for communications over a PCIe bus. In alternative embodiments, the I/O unit 805 may implement other types of well-known bus interfaces.

The PPU 800 also includes a host interface unit 810 that decodes the commands and transmits the commands to the grid management unit 815 or other units of the PPU 800 (e.g., memory interface 880) as the commands may specify. The host interface unit 810 is configured to route communications between and among the various logical units of the PPU 800.

In one embodiment, a program encoded as a command stream is written to a buffer by the CPU. The buffer is a region in memory, e.g., memory 804 or system memory, that is accessible (i.e., read/write) by both the CPU and the PPU 800. The CPU writes the command stream to the buffer and then transmits a pointer to the start of the command stream to the PPU 800. The host interface unit 810 provides the grid management unit (GMU) 815 with pointers to one or more streams. The GMU 815 selects one or more streams and is configured to organize the selected streams as a pool of pending grids. The pool of pending grids may include new grids that have not yet been selected for execution and grids that have been partially executed and have been suspended.

A work distribution unit 820 that is coupled between the GMU 815 and the SMs 850 manages a pool of active grids, selecting and dispatching active grids for execution by the SMs 850. Pending grids are transferred to the active grid pool by the GMU 815 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 820. In addition to receiving grids from the host interface unit 810 and the work distribution unit 820, the GMU 815 also receives grids that are dynamically generated by the SMs 850 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 800. An application may include instructions (i.e., API calls) that cause the driver kernel to generate one or more grids for execution. In one embodiment, the PPU 800 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 800 comprises X SMs 850(X). For example, the PPU 800 may include 15 distinct SMs 850. Each SM 850 is multi-threaded and configured to execute a plurality of threads (e.g., 32 threads) from a particular thread block concurrently. Each of the SMs 850 is connected to a level-two (L2) cache 865 via a crossbar 860 (or other type of interconnect network). A color blend unit 862 is configured to perform blend functions, such as the blend function used to accumulate shaded sample color values into a color buffer that may be stored in the memory 540 and cached in the L2 cache 865.

The L2 cache 865 is connected to one or more memory interfaces 880. Memory interfaces 880 implement 16, 32, 64, 128-bit data buses, or the like, for high-speed data transfer. In one embodiment, the PPU 800 comprises U memory interfaces 880(U), where each memory interface 880(U) is connected to a corresponding memory device 804(U). For example, PPU 800 may be connected to up to 6 memory devices 804, such as graphics double-data-rate, version 5, synchronous dynamic random access memory (GDDR5 SDRAM).

In one embodiment, the PPU 800 implements a multi-level memory hierarchy. The memory 804 is located off-chip in SDRAM coupled to the PPU 800. Data from the memory 804 may be fetched and stored in the L2 cache 865, which is located on-chip and is shared between the various SMs 850. In one embodiment, each of the SMs 850 also implements an L1 cache. The L1 cache is private memory that is dedicated to a particular SM 850. Each of the L1 caches is coupled to the shared L2 cache 865. Data from the L2 cache 865 may be fetched and stored in each of the L1 caches for processing in the functional units of the SMs 850.

The PPU 800 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 800 is embodied on a single semiconductor substrate. In another embodiment, the PPU 800 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 800 may be included on a graphics card that includes one or more memory devices 804 such as GDDR5 SDRAM. The graphics card may be configured to interface with a PCIe slot on a motherboard of a desktop computer that includes, e.g., a northbridge chipset and a southbridge chipset. In yet another embodiment, the PPU 800 may be an integrated graphics processing unit (iGPU) included in the chipset (i.e., Northbridge) of the motherboard.

Figure 9:
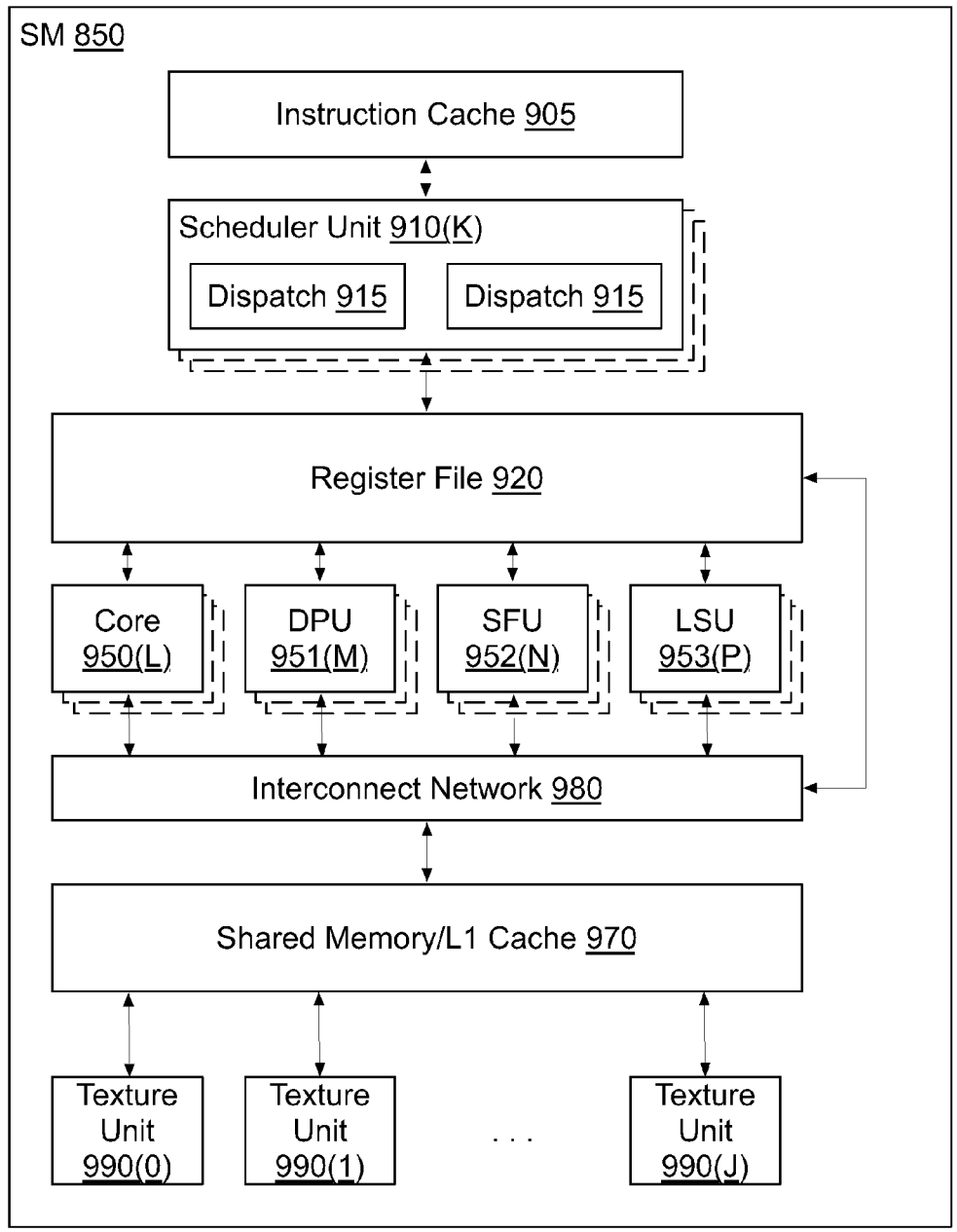
FIG. 9 illustrates the streaming multi-processor of FIG. 8, according to one embodiment.

FIG. 9 illustrates the streaming multi-processor 850 of FIG. 8, according to one embodiment. As shown in FIG. 9, the SM 850 includes an instruction cache 905, one or more scheduler units 910, a register file 920, one or more processing cores 950, one or more double precision units (DPUs) 951, one or more special function units (SFUs) 952, one or more load/store units (LSUs) 953, an interconnect network 980, a shared memory/L1 cache 970, and one or more texture units 990.

As described above, the work distribution unit 820 dispatches active grids for execution on one or more SMs 850 of the PPU 800. The scheduler unit 910 receives the grids from the work distribution unit 820 and manages instruction scheduling for one or more thread blocks of each active grid. The scheduler unit 910 schedules threads for execution in groups of parallel threads, where each group is called a warp. In one embodiment, each warp includes 32 threads. The scheduler unit 910 may manage a plurality of different thread blocks, allocating the thread blocks to warps for execution and then scheduling instructions from the plurality of different warps on the various functional units (i.e., cores 950, DPUs 951, SFUs 952, and LSUs 953) during each clock cycle.

In one embodiment, each scheduler unit 910 includes one or more instruction dispatch units 915. Each dispatch unit 915 is configured to transmit instructions to one or more of the functional units. In the embodiment shown in FIG. 9, the scheduler unit 910 includes two dispatch units 915 that enable two different instructions from the same warp to be dispatched during each clock cycle. In alternative embodiments, each scheduler unit 910 may include a single dispatch unit 915 or additional dispatch units 915.

Each SM 850 includes a register file 920 that provides a set of registers for the functional units of the SM 850. In one embodiment, the register file 920 is divided between each of the functional units such that each functional unit is allocated a dedicated portion of the register file 920. In another embodiment, the register file 920 is divided between the different warps being executed by the SM 850. The register file 920 provides temporary storage for operands connected to the data paths of the functional units.

Each SM 850 comprises L processing cores 950. In one embodiment, the SM 850 includes a large number (e.g., 192, etc.) of distinct processing cores 950. Each core 950 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 850 also comprises M DPUs 951 that implement double-precision floating point arithmetic, N SFUs 952 that perform special functions (e.g., copy rectangle, pixel blending operations, and the like), and P LSUs 953 that implement load and store operations between the shared memory/L1 cache 970 and the register file 920. In one embodiment, the SM 850 includes 64 DPUs 951, 32 SFUs 952, and 32 LSUs 953.

Each SM 850 includes an interconnect network 980 that connects each of the functional units to the register file 920 and the shared memory/L1 cache 970. In one embodiment, the interconnect network 980 is a crossbar that can be configured to connect any of the functional units to any of the registers in the register file 920 or the memory locations in shared memory/L1 cache 970.

In one embodiment, the SM 850 is implemented within a GPU. In such an embodiment, the SM 850 comprises J texture units 990. The texture units 990 are configured to load texture maps (i.e., a 2D array of texels) from the memory 804 and sample the texture maps to produce sampled texture values for use in shader programs. The texture units 990 implement texture operations such as anti-aliasing operations using mip-maps (i.e., texture maps of varying levels of detail). In one embodiment, the SM 850 includes 16 texture units 990.

The PPU 800 described above may be configured to perform highly parallel computations much faster than conventional CPUs. Parallel computing has advantages in graphics processing, data compression, biometrics, stream processing algorithms, and the like. In particular, parallel computing may be used to construct a tree and restructure multiple treelets in parallel.

The bottom-up traversal algorithm that may be used to perform step 310 shown in FIG. 3 during restructuring of multiple treelets in parallel, may have very low SIMD utilization because most of the threads terminate quickly while only a few survive until the end of the optimization. The reduction in parallelism is problematic because the optimization is computationally expensive and would ideally be performed at full utilization of an SM 850. Instead of performing the optimization independently by each thread, a group of 32 threads (e.g., warp) may be used to collaboratively process each treelet. The algorithm used to perform the restructuring should allow parallel execution, such as the algorithm shown in FIG. 4B. Since every treelet occupies 32 threads instead of one, it is enough to have only a modest number of treelets in flight to employ an entire PPU 800. Therefore, more on-chip memory is available for processing each treelet, and the scalability of the algorithm is also improved.

Compared to the code example 400, the code example 420 represents roughly a thousand-fold improvement in terms of execution speed resulting from increased parallelism. However, as a practical matter, the memory space consumed during execution of the example code 400 or 420 for a tree should also be considered. With n=7, the example code 420 executes $(3^n+1)/2-2^n=966$ inner loop iterations and stores $2n-1=127$ scalars in each of the arrays a, $c_{opt}$, and $\bar{p}_{opt}$.

In one embodiment, the PPU 800 includes 14 SMs 850, and each SM 850 can accommodate 64 warps, has a 256 KB register file 920, and 48 KB of fast shared memory in the shared memory/L1 cache 970. Assuming that one treelet is processed by a warp at full occupancy, 32 scalar registers are available per thread and 768 bytes of shared memory are available per treelet. Placing variables a, $c_{opt}$, and $\bar{p}_{opt}$ in shared memory using 4 bytes per element would exceed the available shared memory by a factor of 2. However, because a[s̄] is only needed for calculating $c_{opt}$[s̄], a[s̄] and $c_{opt}$ [s̄] can be overlayed into the same array. Therefore, the array elements initially represent a until line 7 or 20 of the example code 420 when the array elements are turned into $c_{opt}$. Additionally, the elements of $\bar{p}_{opt}$ are 7-bit integers, so memory can be saved by storing the 7-bit integers as bytes. By using a single array for a and $c_{opt}$ and storing the elements of $\bar{p}_{opt}$ as bytes, the arrays may be stored in 636 bytes of shared memory which is within the 768 bytes of shared memory that is available.

In addition to the arrays, the bounding volumes, SAH costs, primitive counts, node children, and identities of the nodes are also tracked, summing to a total of 11 values per node that are stored in the register file, so that one thread stores the values of one node. In one embodiment, each thread in a warp may read values for any node in the treelet, but only the thread assigned to a particular node may modify values of the node.

The most computationally intensive part of processing a treelet is finding the optimal partitioning for each subset of the treelet leaf nodes, corresponding to lines 10-23 in the example code 420. Since there are no dependencies between subsets of the same size, one technique to parallelize the optimization would be to repeatedly pick one subset for each thread until all subsets of the given size have been processed. TABLE 1 shows the statistics for each subset size with n=7. The first three columns correspond to the loops on lines 10, 11, and 14 of the example code 420, respectively. Total work indicates the number of inner loop iterations that are executed for the given k in total, and the last column shows the overall distribution of the workload.

TABLE 1

Statistics for each subset size in example code 420 with n = 7

| Size(k) | Subsets(s̄) | Partitionings(p̄) | Total Work | % |
|---|---|---|---|---|
| 2 | 21 | 1 | 21 | 2 |
| 3 | 35 | 3 | 105 | 11 |
| 4 | 35 | 7 | 245 | 25 |
| 5 | 21 | 15 | 315 | 33 |
| 6 | 7 | 31 | 217 | 22 |
| 7 | 1 | 63 | 63 | 7 |

As shown in TABLE 1, most of the work is concentrated on sizes 4-6, whereas size 2 is practically free. The number of subsets tends to be very uneven, which means that parallelizing the computation over subsets of the same size alone will necessarily lead to low SIMD utilization. In particular, sizes 6 and 7 have the highest amount of work per subset, but offer only a few subsets to process in parallel.

Even though it is necessary for all subsets of size k−1 to be ready before the subsets of size k can be processed to completion, it is still possible to process some subsets of size k earlier. Thus, the SIMD utilization can be improved by allowing the processing of multiple subset sizes to overlap. One approach is to process sizes 2 . . . n−2 in a unified fashion, and treat sizes n−1 and n as special cases.

For sizes 2 . . . n−2, a pre-generated schedule may be used as shown in TABLE 2 for n=7. The schedule consists of a fixed number of processing rounds, and identifies which subset each thread should process in each round, if any. The schedule can be generated for any treelet size and SIMD width using a simple algorithm that considers the rounds in reverse order and greedily includes as many subsets in the current round as possible without violating the dependency rules.

TABLE 2

Pre-generated schedule for n = 7

| Round | Subset sizes processed by 32 threads | Active |
|---|---|---|
| 1 | 2 2 2 2 2 2 2 2 2------------------------------------- | 10 |
| 2 | 3 3 3 3 3 3 3 3 2 2 2 2 2 2 2 2 2 2 2-------------------- | 20 |

TABLE 2-continued

Pre-generated schedule for n = 7

| Round | Subset sizes processed by 32 threads | Active |
|---|---|---|
| 3 | 4 4 4 3 3 3 3 3 3 3 3 3 3 3 3 3 3 3 3 3 3 3 3 3 3 3 3 3 3--- | 29 |
| 4 | 4 4 4 4 4 4 4 4 4 4 4 4 4 4 4 4 4 4 4 4 4 4 4 4 4 4 4 4 4 4 4 4--- | 32 |
| 5 | 5 5 5 5 5 5 5 5 5 5 5 5 5 5 5 5 5 5 5 5 5----------------- | 21 |

Since there are only a few subsets of size n−1 and n, each subset may be parallelized over multiple threads. For n−1, 4 threads are used per subset, and for n, all 32 threads may be used to process the single subset. Parallelization of the subsets is advantageous when the number of partitionings is high enough that the inner loop completely dominates the processing cost. One approach is to consider only a fraction of the partitionings by each thread, and then use parallel reduction to merge the results at the end. Since $\bar{s}$ has a very specific bit pattern with k≥n−1, enumerating the partitionings considered by each thread is straightforward compared to the general case.

In addition to optimizing the partitioning, the AABB calculation for each value of $\bar{s}$ on lines 2-4 of example code 420 may also be parallelized. The minimum or maximum for the 6 scalar components of up to n individual AABBs is computed in parallel by assigning a group of $2^{n-5}$ consecutive subsets to each thread. These subsets share the same 5 highest bits of $\bar{s}$, so an intermediate AABB is calculated first, considering only the leaf nodes that correspond to the 5 highest bits. To obtain the final AABBs, the result is augmented with each combination of the remaining leaf nodes.

Forming the initial treelet is accomplished by expanding the treelet one node at a time in sequential fashion starting with the root node, maintaining a one-to-one mapping between nodes and threads. Even though only the first 2n−1 threads are employed, the overall process is still relatively efficient. At each step, the treelet leaf node with the largest surface area is selected using parallel reduction, and then the two children of the selected leaf node are assigned to two vacant threads. To avoid having to fetch full AABBs from memory for the selection, the values of A(n) may be maintained in a separate array throughout construction of the initial treelet and also during optimization of the treelet.

Reconstruction of the optimal treelet from $\bar{p}_{opt}$ can be performed in a similar manner as formation of the initial treelet, except that the identities of the original internal nodes are reused for the newly created internal nodes. After the reconstruction, new AABBs are calculated for the internal nodes based on their children, the process is repeated in parallel until the results have propagated to the treelet root. Finally, the nodes of the treelet are stored back to memory, bypassing the L1 cache in order to ensure that the results are visible to all SM 850s. As a minor optimization, the output part of the algorithm may be skipped in case it was not possible to improve the SAH cost, i.e., $c_{opt}[2^n-1] \geq C(\text{root})$.

The main loop of the BVH optimization kernel may be organized according to a parallel bottom-up traversal algorithm. Each thread starts from a given BVH leaf node and then walks up the tree, terminating as soon as the thread encounters a node that has not been visited by any other thread. The goal is to form a treelet for each node encountered during the traversal, if the node's corresponding subtree is large enough to support the particular choice of n. In practice, the processing switches from per-thread processing (traversal) to per-warp processing (optimization) at the end of each traversal step, and the set of valid treelet roots is broadcast to the entire warp.

To determine whether a given subtree is large enough to support a treelet with n leaf nodes, the fact that the intermediate BVH always stores one primitive per leaf may be utilized. Since the number of primitives is tracked for the purposes of Equation 2, the same information may be used to decide whether to accept a given node as a treelet root. However, the choice does not necessarily have to be made based on n—any γ≥n may be used, and only nodes whose respective subtrees contain at least γ primitives may be chosen as a treelet root.

A full binary tree with m leaf nodes can contain at most $2m/\gamma - 1$ subtrees with γ or more leaf nodes, and practical BVHs also tend to exhibit similar behavior. Given that the optimization kernel is virtually always dominated by treelet processing, the execution time may be described as $O(m/\gamma)$ to a sufficient degree of accuracy. This means that γ provides a very effective way to trade BVH quality for reduced construction time by concentrating less effort on the bottom-most nodes whose contribution to the SAH cost is low.

In practice, multiple rounds of bottom-up traversal and treelet optimization are executed in order for the SAH cost to converge. However, in practice, the bottom part of the BVH generally tends to converge faster that the top part. This is not surprising considering that modifying the top-most nodes can potentially have a large impact on the entire tree, whereas modifying the bottom-most ones usually only affects small localized parts of the scene.

Based on this observation, it makes sense to vary the value of γ between rounds. In one embodiment, doubling the value of γ after each round may be very effective in reducing the construction time while having only a minimal impact on BVH quality. Using γ=n=7 as the initial value and executing 3 rounds in total has proven to be a good practical choice for many test scenes.

Figure 10:
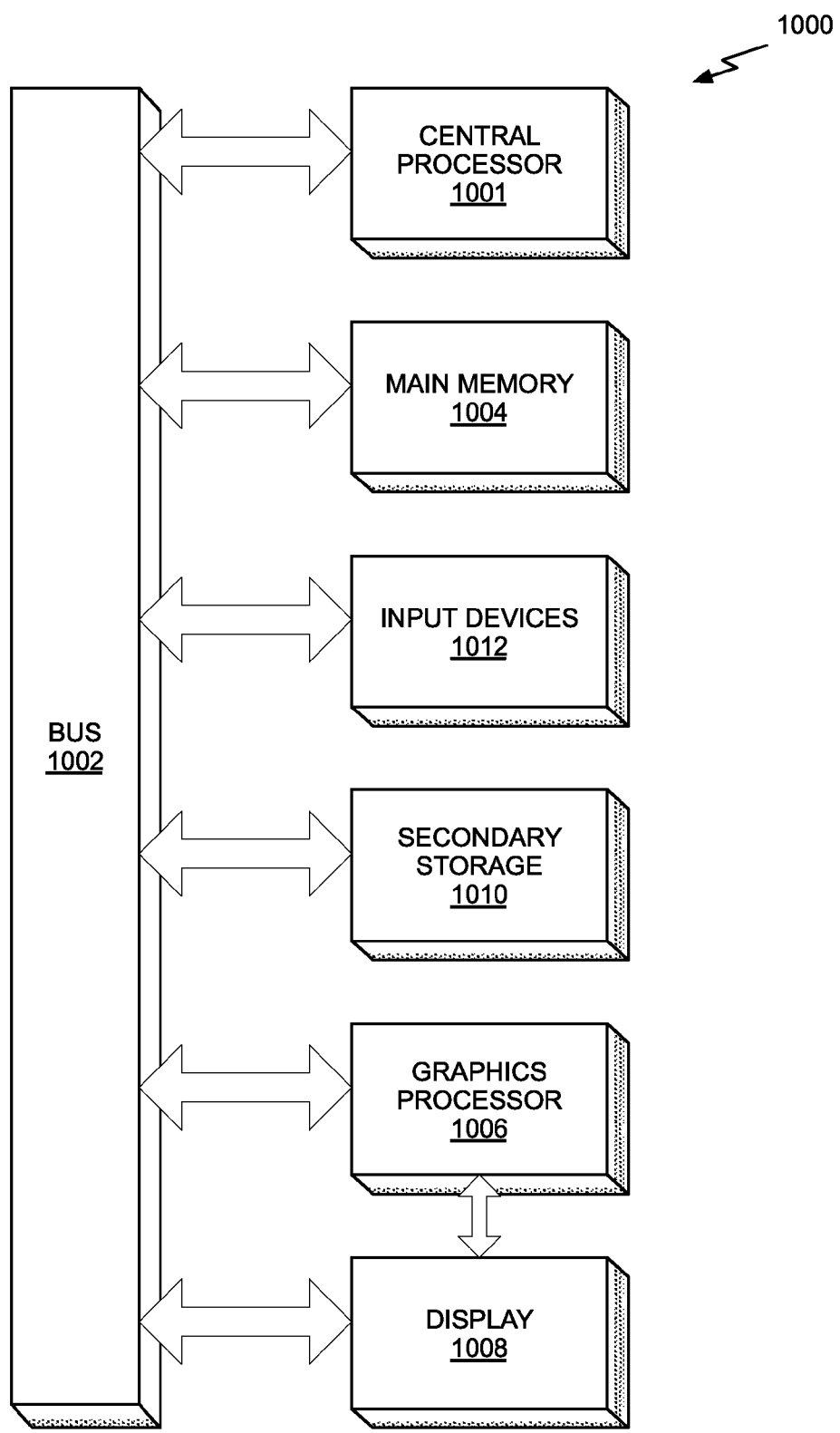
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. User input may be received from the input devices 1012, e.g., keyboard, mouse, touchpad, microphone, and the like. In one embodiment, the graphics processor 1006 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1004 and/or the secondary storage 1010. Such computer programs, when executed, enable the system 1000 to perform various functions. For example, a compiler program that is configured to examiner a shader program and enable or disable attribute buffer combining may be stored in the main memory 1004. The compiler program may be executed by the central processor 1001 or the graphics processor 1006. The main memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a parallel processing unit that is configured to execute threads in a group of threads in parallel, a plurality of primitives comprising a scene;
   identifying a pre-determined plane that intersects the scene;
   splitting, in parallel, bounding volumes of the plurality of primitives that are intersected by the pre-determined plane, wherein a bounding volume that encloses each intersected primitive of the plurality of primitives is split into a first bounding volume and a second bounding volume at an intersection of the bounding volume and the pre-determined plane and a first node in a hierarchical tree data structure stored in a memory corresponds to the first bounding volume;
   calculating a priority value for each primitive in the plurality of primitives that indicates a relative importance for splitting the primitive compared with other primitives in the scene;
   iteratively computing a scaling factor by bisecting a range bounding the scaling factor while ensuring that the scaling factor corresponds to a total number of splits for the scene that does not exceed a maximum number of splits;
   Computing a number of splits allocated for each primitive in the plurality of primitives based on the priority value computed for the primitive and the scaling factor.

2. The method of claim 1, wherein the pre-determined plane is a spatial median plane.

3. The method of claim 1, wherein the bounding volume is an axis-aligned bounding box.

4. The method of claim 1, wherein the at least one primitive is a triangle.

5. The method of claim 1, further comprising:
   determining that the bounding volume is intersected by a second pre-determined plane; and
   determining that the pre-determined plane is dominant relative to the second pre-determined plane.

6. The method of claim 1, wherein the pre-determined plane is included in a set of at least two planes that each intersect the scene.

7. The method of claim 6, wherein the set of planes correspond to spatial median planes used to generate a bounding volume hierarchy (BVH) tree structure for the plurality of primitives.

8. The method of claim 1, further comprising determining a fixed maximum number of splits to perform on the plurality of primitives.

9. The method of claim 8, wherein the fixed maximum number of splits corresponds to an amount of memory allocated to store data associated with split bounding volumes.

10. The method of claim 1, distributing a total number of splits among the plurality of primitives.

11. The method of claim 1, further comprising:
    determining a remaining split allocation for the at least one primitive; and
    distributing the remaining split allocation among the first bounding volume and the second bounding volume.

12. The method of claim 1, further comprising constructing an initial hierarchical tree data structure having the first node corresponding to the first bounding volume and a second node corresponding to the second bounding volume.

13. The method of claim 1, wherein the splitting is performed in parallel by assigning each intersected primitives of the plurality of primitives within a treelet to a separate thread in a group of threads that are executed in parallel.

14. A non-transitory computer-readable storage medium storing instructions that, when executed by a processor, cause the processor to split a bounding volume of at least one primitive, comprising:
    receiving, by a parallel processing unit that is configured to execute threads in a group of threads in parallel, a plurality of primitives comprising a scene;
    identifying a pre-determined plane that intersects the scene;
    splitting, in parallel, bounding volumes of the plurality of primitives that are intersected by the pre-determined plane, wherein a bounding volume that encloses each intersected primitive of the plurality of primitives is split into a first bounding volume and a second bounding volume at an intersection of the bounding volume and the pre-determined plane and a first node in a hierarchical tree data structure stored in a memory corresponds to the first bounding volume;
    calculating a priority value for each primitive in the plurality of primitives that indicates a relative importance for splitting the primitive compared with other primitives in the scene;
    iteratively computing a scaling factor by bisecting a range bounding the scaling factor while ensuring that the scaling factor corresponds to a total number of splits for the scene that does not exceed a maximum number of splits;
    Computing a number of splits allocated for each primitive in the plurality of primitives based on the priority value computed for the primitive and the scaling factor.

15. The non-transitory computer-readable storage medium of claim 14, further comprising constructing an initial hierarchical tree data structure having the first node corresponding to the first bounding volume and a second node corresponding to the second bounding volume.

16. The non-transitory computer-readable storage medium of claim 14, wherein the splitting is performed in parallel by assigning each intersected primitives of the plurality of primitives within a treelet to a separate thread in a group of threads that are executed in parallel.

17. A system comprising: a memory storing a plurality of primitives for a three-dimensional scene; and a parallel processing unit that is coupled to the memory and executes threads in a group of threads in parallel and is configured to:
    receive the plurality of primitives comprising a scene;
    identify a pre-determined plane that intersects the scene;
    split, in parallel, bounding volumes of the plurality of primitives that are intersected by the pre-determined plane, wherein a bounding volume that encloses each intersected primitive of the plurality of primitives is split into a first bounding volume and a second bounding volume at an intersection of the bounding volume and the pre-determined plane and a first node in a hierarchical tree data structure stored in a memory corresponds to the first bounding volume;
    calculate a priority value for each primitive in the plurality of primitives that indicates a relative importance for splitting the primitive compared with other primitives in the scene;
    iteratively computing a scaling factor by bisecting a range bounding the scaling factor while ensuring that the scaling factor corresponds to a total number of splits for the scene that does not exceed a maximum number of splits;
    Computing a number of splits allocated for each primitive in the plurality of primitives based on the priority value computed for the primitive and the scaling factor.

18. The system of claim 17, wherein the splitting is performed in parallel by assigning each intersected primitives of the plurality of primitives within a treelet to a separate thread in a group of threads that are executed in parallel.

* * * * *